(12) United States Patent
Fraser et al.

(10) Patent No.: US 11,244,385 B1
(45) Date of Patent: Feb. 8, 2022

(54) SYSTEM AND METHOD FOR PROVIDING VIRTUAL COACHING

(71) Applicant: Wells Fargo Bank, N.A., San Francisco, CA (US)

(72) Inventors: Tyua Fraser, Livermore, CA (US); Jennifer A. Hammer, Berkeley, CA (US); Josh Neal, San Francisco, CA (US); Dana Neitz, San Francisco, CA (US); Masoud Vakili, Los Altos, CA (US); Molly Wilcox, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 10 days.

(21) Appl. No.: 16/156,512

(22) Filed: Oct. 10, 2018

(51) Int. Cl.
  *G06Q 40/02* (2012.01)
  *G06F 3/0482* (2013.01)
  *G06F 9/451* (2018.01)

(52) U.S. Cl.
  CPC ........... *G06Q 40/02* (2013.01); *G06F 3/0482* (2013.01); *G06F 9/453* (2018.02)

(58) Field of Classification Search
  CPC ............................... G06Q 40/00; G06Q 30/02
  See application file for complete search history.

(56) References Cited

U.S. PATENT DOCUMENTS

| | | | |
|---|---|---|---|
| 5,920,848 A | 7/1999 | Schutzer et al. | |
| 6,012,044 A | 1/2000 | Maggioncalda et al. | |
| 6,289,399 B1 * | 9/2001 | Furuichi | G06F 1/3203 710/6 |
| 7,065,512 B1 * | 6/2006 | Bertrand | G09B 7/02 706/12 |
| 7,280,991 B1 * | 10/2007 | Beams | G09B 5/14 706/46 |
| 7,315,837 B2 * | 1/2008 | Sloan | G06Q 30/02 705/35 |
| 7,401,040 B2 | 7/2008 | Sloan et al. | |
| 7,433,840 B2 | 10/2008 | Carnahan et al. | |
| 7,509,279 B2 | 3/2009 | Chhabra et al. | |
| 7,783,545 B2 | 8/2010 | Sloan et al. | |
| 7,921,048 B2 | 4/2011 | Sloan et al. | |

(Continued)

OTHER PUBLICATIONS

Bida, Alla; "PFM of the Future: A Virtual Finance Coach", http://wiprodigital.com/2015/12/03/pfm-of-the-future-a-virtual-finance-coach/, Dec. 3, 2015.

(Continued)

*Primary Examiner* — Daniel S Felten
(74) *Attorney, Agent, or Firm* — Foley & Lardner LLP

(57) ABSTRACT

A system for providing coaching includes a system that creates a user-specific coach to assist a user in achieving one or more goals, such as, e.g., a financial goal. The coach is generated based on one or more traits of the user to increase the likelihood that the user will relate and respond to communications from the coach in a manner that enables the user to achieve his/her goal. The traits used by the system to create the coach can include traits input directly by a user, as well as user traits deduced by the system by monitoring various types of user behavior, including the user's usage of computing devices, habits, etc. The system also adapts the coaching provided by the coach in response to trends noted by the coaching system as the system is used by the user as well as others.

20 Claims, 7 Drawing Sheets

(56) References Cited

U.S. PATENT DOCUMENTS

| | | | | |
|---|---|---|---|---|
| 7,949,588 B2* | 5/2011 | Willis | | G06Q 30/02 |
| | | | | 705/35 |
| 7,991,675 B2 | 8/2011 | Loeper | | |
| 9,495,700 B2 | 11/2016 | Hoch et al. | | |
| 10,678,570 B2* | 6/2020 | Zarlengo | | G06Q 40/02 |
| 2002/0095363 A1* | 7/2002 | Sloan | | G06Q 40/02 |
| | | | | 705/36 R |
| 2002/0099613 A1* | 7/2002 | Swart | | G06Q 10/02 |
| | | | | 705/7.34 |
| 2002/0132211 A1* | 9/2002 | August | | G09B 19/0038 |
| | | | | 434/247 |
| 2002/0147671 A1* | 10/2002 | Sloan | | G06Q 40/025 |
| | | | | 705/36 R |
| 2002/0161928 A1* | 10/2002 | Ndili | | H04L 29/06 |
| | | | | 709/246 |
| 2004/0054610 A1 | 3/2004 | Amstutz et al. | | |
| 2006/0074788 A1 | 4/2006 | Grizack et al. | | |
| 2008/0059900 A1* | 3/2008 | Murray | | G06F 9/453 |
| | | | | 715/777 |
| 2009/0012761 A1* | 1/2009 | Bertrand | | G09B 7/00 |
| | | | | 703/6 |
| 2010/0179833 A1* | 7/2010 | Roizen | | G06Q 50/22 |
| | | | | 705/2 |
| 2016/0070581 A1* | 3/2016 | Soon-Shiong | | G06Q 50/10 |
| | | | | 715/706 |
| 2016/0330200 A1 | 11/2016 | Ansari et al. | | |
| 2016/0335405 A1* | 11/2016 | Perunov | | G06N 20/00 |
| 2017/0084189 A1* | 3/2017 | Rubalcaba | | G09B 19/00 |

OTHER PUBLICATIONS kitces.com, "What is Financial Coaching, and Best Practices for Becoming One", https://www.kitces.com/blog/financial-coaching-what-it-is-and-how-to-become-one/, Mar. 20, 2017. 41 pages.

McKinsey, "The Virtual financial advisor: delivering personalized advice in the digital age", https://www.mckinsey.com/industries/financial-services/our-insights/the-virtual-financial-advisor-delivering-personalized-advice-in-the-digital-age, Jun. 2015. 20 pages.

McNamara, Carter; "All About Personal and Professional Coaching", https://managementhelp.org/leadingpeople/coaching.htm, Dec. 31, 2010. 12 pages.

Najar et al., "The new place of financial advisors in customer experience", https://www.wavestone.com/app/uploads/2016/10/The-new-place-of-financial-advisors-in-customer-experience-Wavestone-EFMA.pdf, Oct. 2016. 52 pages.

* cited by examiner

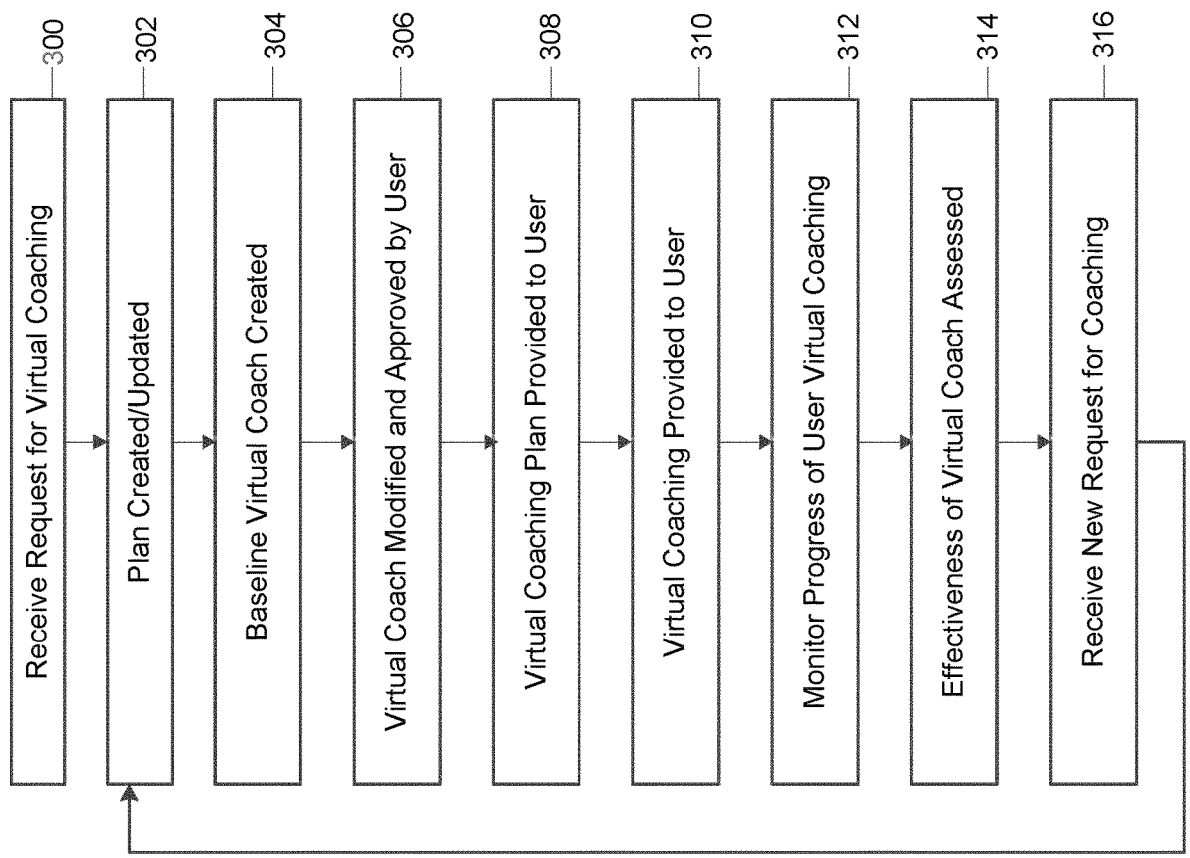

SYSTEM AND METHOD FOR PROVIDING VIRTUAL COACHING

BACKGROUND

The ability of an individual to successfully follow and stick to a financial plan to achieve his/her financial goals is enhanced through the use of a financial coach. Among other things, financial coaches may: alert the individual to any issues or problems with his/her financial plan, assist the individual with financial decisions, ensure that the individual does not stray from their selected financial plan, etc.

Currently, options for individuals seeking financial coaching include human financial advisors or predefined non-specific virtual coaching programs. While coaching provided by a human advisor may be targeted to a specific individual's needs, goals, personality, etc., factors such as, e.g., economic costs, advisor availability and/or access, inability of a human advisor to provide round-the-clock, undivided attention to the needs of a single user, etc. may limit the effectiveness of such coaching from a human advisor.

Although current, predefined non-specific virtual coaching programs may overcome the economic and accessibility limitations of receiving coaching from human advisors, such generic, non-specific virtual coaching programs are often ineffective in assisting a user achieve his/her goals. In particular, the lack of tailoring of current, predefined non-specific virtual coaching programs to suit the personality, habits, goals, needs, etc. of a specific user and/or the inability of such predefined, non-specific virtual coaching programs to customize the content or manner of delivering coaching to a user often make it unlikely that a user will positively react to and engage with the virtual coaching to the degree required for such a generic virtual coaching program to successfully assist the user in implementing a plan that would allow the user to achieve his/her goals.

SUMMARY

One arrangement of the present disclosure is a method of providing virtual financial coaching to a user. The method includes creating, by a computing device of a provider, a baseline virtual coach defined by one or more coach features. A graphical user interface to be displayed by a mobile application on a user device on which the mobile application is stored is transmitted by the provider computing device. The graphical user interface includes one or more user selectable options allowing a user to select one or more features that are to define a user-specific virtual coach. One or more selections input by the user via the graphical user interface are received by the provider computing device. A user-specific virtual coach based on features of the baseline virtual coach and the feature selections received from the user is created by the provider computing device. A financial goal of the user is identified by the provider computing device. A communication to the user containing information related to the financial goal of the user is created by the provider computing device. At least one feature of the communication is based on a feature of the user-specific virtual coach. The communication is sent by the provider computing device to a device of a user.

Another arrangement of the present disclosure is a system for providing virtual financial coaching to a user. A provider computing system include one or more circuits configured to: transmit a graphical user interface to be displayed by a mobile application on a user device on which the mobile application is stored, the graphical user interface including one or more user selectable options allowing a user to select one or more features that are to define a user-specific virtual coach; receive one of more selections input by the user via the graphical user interface; create a user-specific virtual coach based on features of the baseline virtual coach and the feature selections received from the user; identify a financial goal of the user; create a communication to the user containing information related to the financial goal of the user, wherein at least one feature of the communication is based on a feature of the user-specific virtual coach; and send the communication to a device of a user.

Another arrangement of the present disclosure is a non-transitory computer-readable medium having processor-readable instructions stored thereon such that, when executed by a processor, cause the processor to: transmit a graphical user interface to be displayed by a mobile application on a user device on which the mobile application is stored, the graphical user interface including one or more user selectable options allowing the user to select one or more of the features that are to define a user-specific virtual coach; receive one or more selections input by the user via the graphical user interface; create a user-specific virtual coach based on the baseline virtual coach and the selections received from the user; identify a financial goal of a user; create a communication containing information related to the financial goal, wherein at least one feature of the communication is based on a feature of the user-specific virtual coach; and send the communication to a device of a user.

BRIEF DESCRIPTION OF THE DRAWINGS

The above and other aspects and features of the present disclosure will become more apparent to those skilled in the art from the following detailed description of the example arrangements with reference to the accompanying drawings, in which:

FIG. 3 is a flow diagram of a process or method for providing virtual coaching, according to an example embodiment;

DETAILED DESCRIPTION

Figure 1:
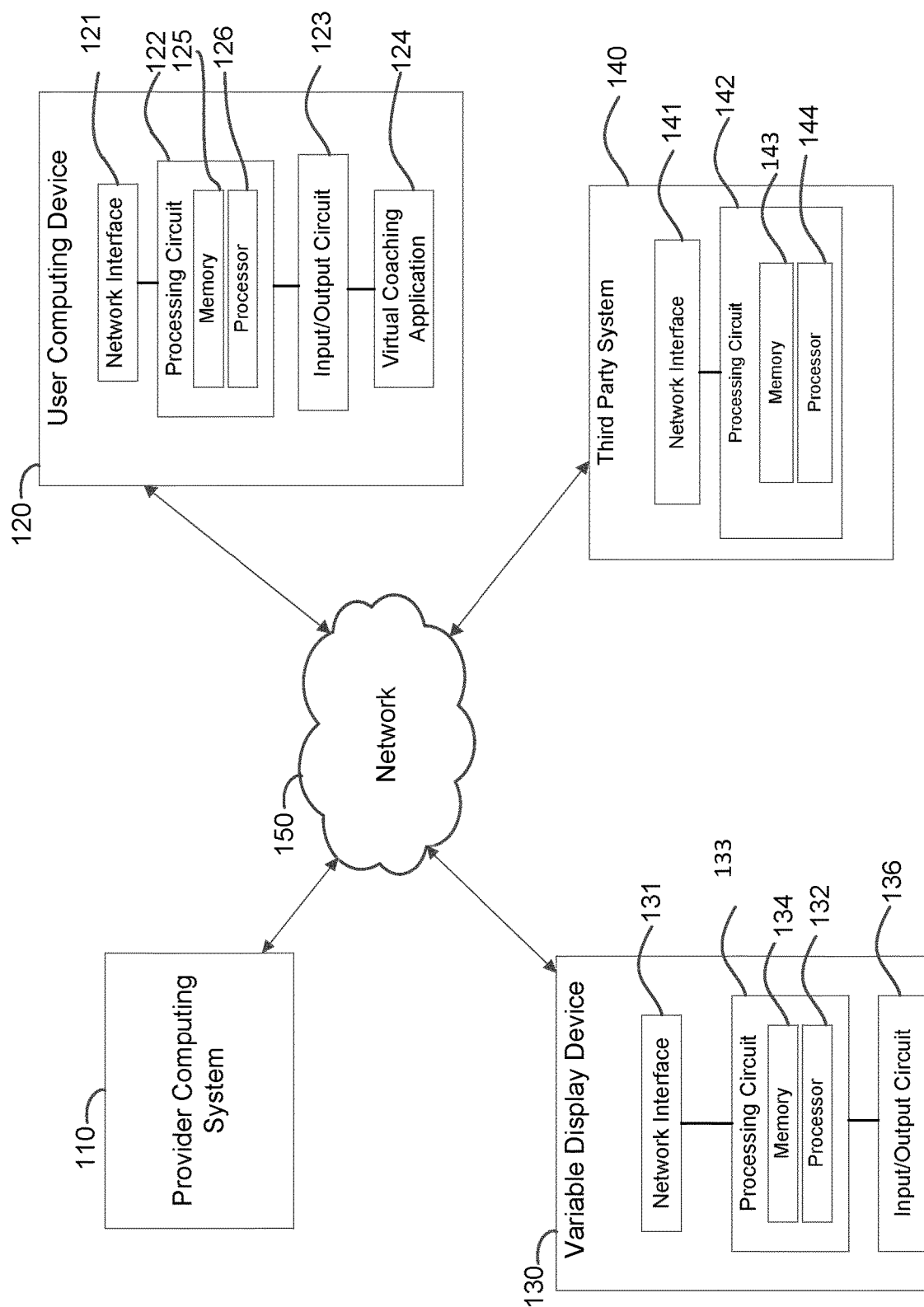
FIG. 1 is a diagram of a system for providing virtual coaching according to an example embodiment.

Given that the likelihood of a user following and thereby benefiting from the advice offered by a financial coach is often dependent on the compatibility of the coaching personality/persona with the individual user and his/her financial goals and the targeting of the contents, manner, and frequency of communication provided by the coach to the habits and preferences of a user, it would be desirable to provide a virtual coach having variable personas/personalities that can be adjusted and modified to best suit the unique traits of the individual and his/her financial goals, and which is configured to provide coaching in a manner that is most relevant to (and therefore most likely to be followed by) a user.

Referring generally to FIGS. 1-5, systems and methods for providing a user-specific virtual coach to assist a user in achieving a goal according to various arrangements are shown. In general, a computing system associated with a provider is configured to receive information related to a user, such as, e.g., a financial goal of a user. The financial goal may be broad and open-ended (e.g., overall financial health), or may be defined by one or more specific desired end results (e.g., purchase of a new car, establishment of a college fund). A financial plan is developed, which outlines steps for achieving the financial goal of the user. The computing system is configured to generate a virtual coach characterized by features that are specific to the user and/or the financial goal of the user. Once the virtual coach has been created, the computing system utilizes the virtual coach to provide information and feedback to the user in a manner that has been determined to be the most effective way in which to relay information to the user. Thus, using the virtual coaching systems and methods employed herein, the likelihood that a user will achieve his/her financial goal is increased.

The arrangements and implementations of the systems and methods disclosed herein improve current systems for providing a user with coaching for financial health, by making financial coaching accessible to all users, irrespective of assets, types of accounts held by the user, the availability of the user, etc., and by customizing and tailoring the coaching to an individual user. In particular, the systems and methods disclosed herein are configured to identify goals specific to the user and then create a plan best suited to the individual needs of the user, and are also configured to create a virtual coach having traits and features that correspond to traits and features that are most relevant to the personality, habits, lifestyle, etc. of the user so as to increase the likelihood that the virtual coaching provided by the virtual coach will effectively impact, influence and assist the user in implementing the plan to achieve his/her goal.

Additionally, by being configured to base the traits and features of the virtual coach on both explicitly and implicitly collected information related to the user, the systems and methods disclosed herein are configured to tailor the virtual coaching not only on specific, communicated requests and information provided by the user, but also on traits and features correlated to various monitored user behavior, traits, activities, etc. that the user himself/herself may not have appreciated, realized or recognized as being features and traits that would be relevant to the creation of the virtual coach. Also, by continuously gathering, processing and analyzing information collected based on previous and current uses of the user-specific virtual coaching system by the user and/or other individuals, the systems and methods disclosed herein are configured to continuously improve the effectiveness with which customized virtual coaching is provided to users.

Moreover, in addition to providing an improved method and system for providing a user with coaching, the various features and aspects of the systems and methods disclosed herein also improve upon existing personal electronic devices and electronic information sources (e.g., databases, websites, social networking programs, etc.) accessible with such devices. For example, by providing a source of user behavior, activities, etc., that can be used to obtain implicit information that the user himself/herself may not be aware of and/or information that would not be obtainable by a human advisor, the technical utility and effectiveness of the electronic information source is improved, in that the ability of the electronic content source to assist in the effective coaching of an individual is enhanced. Similarly, by utilizing user-specific data to tailor and curate (among other things) the contents, frequency, and mode of coaching communications in a manner that is most relevant to a user, and by allowing for actionable coaching advice to be delivered to a user in real-time when such advice is most likely to impact a user, the technical utility and effectiveness of the electronic devices is also improved, in that the ability of the electronic device to assist in the effective coaching of an individual is enhanced.

As shown in FIG. 1, according to one arrangement, the virtual coaching system 100 includes a provider computing system 110, a user computing device 120, a variable display device 130, and a third-party system 140. The various components of the virtual coaching system 100 are configured to communicate with each other over a network 150. The network 150 is a data exchange medium, which includes wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 150 includes the internet.

The provider computing system 110 is a computing system at a provider configured to create a virtual coach intended to assist a user in achieving his/her goal(s). According to some arrangements, the provider computing system 110 is operated by a provider of financial services, such as, e.g. a bank, credit union, investment brokerage, or any other organization, institution or system that provides financial services, with the one or more goals which the virtual coaching system 100 is configured to assist the user in achieving being related to financial goals of the user. According to various arrangements, the provider computing system 110 is adapted to provide additional services in addition to the creation of a virtual coach.

Among other types of user information, the provider computing system 110 is configured to receive information related to the goals and/or virtual coach preferences of the user from the user computing device 120 and/or third-party system 140 over the network 150. In response to this received information, the provider computing system 110 is configured to present to the user via the user computing device 120 and/or variable display device 130 communications from a user-specific virtual coach. In addition to (or as an alternative to) the communications from the virtual coach that are provided via the user computing device 120 and/or variable display device 130, the virtual coach provided by the provider computing system 110 is also adapted to instruct the third-party system 140 to perform/effectuate one or more actions configured to assist with accomplishing the goal of the user. As such, the virtual coach that is provided to the user via the user computing device 120, variable display device 130 and/or third-party system 140 is configured to assist the user in implementing a plan intended to assist the user in achieving one or more goals.

The user computing device 120 is a computing system associated with a user, and may include any wearable and non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. User computing device 120 may also include any type of mobile device including, but not limited to, a phone (e.g., smart phone, etc.) and a computing device (e.g., desktop computer, laptop computer, personal digital assistant, etc.).

As shown in FIG. 1, user computing device 120 generally comprises a network interface 121, a processing circuit 122, and an input/output circuit 123. Network interface 121 includes program logic that facilitates connection of the user computing device 120 to the network 150. Accordingly, the network interface 121 supports communication via network 150 between the user computing device 120, the provider computing system 110, variable display device 130, and third-party system 140. The network interface 121 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 121 includes cryptography capabilities to establish a secure or relatively secure communication session.

The processing circuit 122 is configured to at least partly control the user computing device 120 as described herein. The processing circuit 122 includes one or more memory devices 125 and processor 126. The processor 126 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 125 (e.g., RAM, ROM, NVRAM, Flash Memory, hard disk storage, etc.) may store data and/or computer code for facilitating at least some of the various processes described herein. In this regard, the one or more memory devices 125 may store programming logic that, when executed by the processor 126, controls the operation of the user computing device 120.

The input/output circuit 123 is structured to receive from and provide communication(s) to a user of the user computing device 120. The input/output circuit 123 includes one or more input/output components that interface with a user (e.g., screens, speakers, microphones, remotes, buttons, touchscreens, vibration mechanisms) as well as any combination of hardware components, communication circuitry, and machine-readable media for facilitating the exchange of information between the input/output components and elements of the user computing device 120, including the processing circuit 122 and the network interface 121. For example, in an embodiment where the user computing device 120 is a smartphone or a tablet, the input/output components may include a touch screen, one or more speakers, one or more microphones, one or more cameras, and/or a fingerprint reader. In an embodiment where the user computing device 120 is a television, the input/output components may include a television display (e.g., liquid-crystal-display, plasma display, light-emitting-diode display), one or more speakers, and a remote control with buttons that can be pressed by a user. In an embodiment where the user computing device 120 is a smart watch, the input/output components may include a screen, a speaker, a vibration generator, and a touch-sensitive bezel, screen, and/or buttons. The input/output circuit 123 thereby facilitates two-way transfer of information between a user and a user computing device 120. As will be understood, according to various embodiments, the variable display device 130 may comprise the output component(s) of the input/output components of the user computing device 120.

As noted above, according to various arrangements the user computing device 120 may be defined by any number of different devices. Additionally, according to various arrangements, the user computing device 120 may comprise a plurality of the same or different devices. In some such arrangements, some or all of the multiple devices defining the user computing device 120 are used simultaneously to receive information from the other component(s) of the virtual coaching system 100 (e.g., in some arrangements communications from the provider computing system 110 are simultaneously transmitted to each of the user computing devices 120). Alternatively, or additionally, in some arrangements, information/communication from other components of the virtual coaching system 100 are selectively transmitted to only some of the specific individual devices defining the user computing device 120. For example, in some arrangements certain types of communications are sent exclusively to a particular type of device (e.g. a smartwatch) defining the user computing device 120, while other types of communications are sent exclusively to another particular type of device (e.g. a smartphone) defining the user computing device 120. In other arrangements, the selection of a particular device is alternatively, or additionally, based on other factors, such as, e.g., the timing of the communication, the content of the communication, the type of device from which the last communication from the user computing device 120 was received, etc. As will be described in more detail below, according to various arrangements, the selection of which of the one or more devices defining the user computing device 120 that communications are transmitted to may be based on information stored in the virtual coach database 232 that has been acquired by the adaptive circuit 236 over the course of the operation of the virtual coaching system 100.

According to various arrangements, the user computing device 120 may include a virtual coaching application 124 obtained from the provider computing system 110 via which the user computing device 120 is configured to receive information from and transmit information to the provider computing system 110 related to the virtual coaching system 100. The virtual coaching application 124 facilitates receiving and displaying communications to and from the virtual coaching circuit 112. Thus, the virtual coaching application 124 facilitates the coaching provided by the virtual coaching system 100.

In some arrangements, the virtual coaching application 124 is incorporated with an existing application provided by the provider computing system 110 and stored or otherwise accessible by the user computing device 120. In other arrangements, the virtual coaching application 124 may be a separate application provided by the provider computing system 110. The virtual coaching application 124 may be downloaded by the user computing device 120 prior to its usage, may be hard coded into the memory of the user computing device 120, or may be a web-based interface application that is executed and maintained remotely, and which is displayed and made accessible to a user via a web browser (or other client interface) of the user computing device 120. In the latter instance, the user may have to log onto or access the web-based interface before usage of the virtual coaching application 124. In certain embodiments, the virtual coaching application 124 may include an application programming interface (API) and/or a software development kit (SDK) that facilitate the integration of other applications with the virtual coaching application 124.

The variable display device 130 is a device configured to present to a user visual, audio, and/or haptic communications from any of the provider computing system 110, user computing device 120, and/or the third-party system 140 in response to communication received directly or indirectly from the provider computing system 110 via the network 150 by a network interface 131 of the variable display device 130. The network interface 131 of the variable display device 130 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 131 includes cryptography capabilities to establish a secure or relatively secure communication session.

According to various arrangements, the variable display device 130 presents coaching-related communications to the user from the user-specific virtual coach provided by the provider computing system 110 that are intended to inform, guide, instruct, encourage, or otherwise assist the user towards achieving his/her goal. The variable display device 130 comprises any number of various devices such as, but not limited to: digital assistant devices, smartphones, tablets, wearables, laptop or desktop computers, televisions, gaming devices, on-board vehicle controllers, smart home-appliances, etc. capable of transmitting visual, audio, and/or haptic communications. As will be explained in more detail below, according to various arrangements, the transmission of communications from the virtual coach provided by the provider computing system 110 to the variable display device 130 is in part based in response to usage or patterns of usage of the variable display device 130 by the user that is detected or sensed by a user profile circuit 231 provided by the provider computing system 110.

As illustrated in FIG. 1, according to various embodiments, the variable display device 130 may additionally include a processing circuit 132 including one or more memory devices 133 and a processor 134. The processor 134 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 133 (e.g., RAM, ROM, NVRAM, Flash Memory, hard disk storage, etc.) may store data and/or computer code for facilitating at least some of the various processes described herein. In this regard, the one or more memory devices 133 may store programming logic that, when executed by the processor 134, controls the operation of the variable display device 130.

As further illustrated in FIG. 1, according to various embodiments, the variable display device 130 includes an input/output circuit 136 structured to receive communications from the provider computing system 110 and/or user computing device 120, in response to which the variable display device 130 outputs communication(s) to a user via any one of or any combination of output components of the variable display device 130, such as, e.g., a screen, speaker, microphone, remote, button, touchscreen, vibration mechanisms, etc.

The third-party system 140 comprises any number of different devices, programs, networks or systems utilized by the user and from which the provider computing system 110 is able to obtain additional user information and/or monitor user behavior and/or activity to generate a more customized and tailored user-specific virtual coach over the network 150 via a network interface 141 of the third-party system 140. Additionally, or alternatively, the third-party system 140 may also comprise any number of different devices, programs, networks or systems capable of being utilized by the user-specific virtual coach created by provider computing system 110 to assist the user in realizing his/her goal. In arrangements in which the third-party system 140 is used to both supplement the user information available to the virtual coaching system 100 and to expand the ways by which the virtual coaching system 100 assists the user, the devices, programs, networks and systems used to obtain additional user information can be the same or different as those which are utilized by the virtual coach to assist in meeting the goal of the user.

The network interface 141 of the third-party system 140 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the provider network interface 111 includes cryptography capabilities to establish a secure or relatively secure communication session. As illustrated in FIG. 1, according to various embodiments, the third-party system 140 may additionally include a processing circuit 142 including one or more memory devices 143 and a processor 144. The processor 144 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 143 (e.g., RAM, ROM, NVRAM, Flash Memory, hard disk storage, etc.) may store data and/or computer code for facilitating at least some of the various processes described herein. In this regard, the one or more memory devices 143 may store programming logic that, when executed by the processor 144, controls the operation of the third-party system 140.

Non-limiting examples of a third-party system 140 include social media sites, smartphone or tablet applications, web-browsers, personal computing and mobile devices, (e.g. smartphones, tablets, portable gaming devices, personal digital assistants, laptops, desktop computers, etc.), cookies, chat sessions, call recordings, user accounts at or other institutions, GPS devices, physiological monitors, televisions and television accessories (e.g., smart televisions, projectors, gaming consoles, DVD/Blu-ray players, digital cable/satellite boxes, media streaming devices), voice assistants, automobile entertainment systems, wearable devices (virtual reality headsets, augmented reality headsets, smart watches, fitness trackers); etc.

Although the provider computing system 110, the user computing device 120, the variable display device 130 and the third-party system 140 have each been described as being discrete, standalone components of the virtual coaching system 100. It is to be understood that any combination of one or more of these components may be incorporated into a single, multi-function device/system. For example, according to various arrangements, a smartphone of a user functions as the user computing device 120, the variable display device 130 and the third-party system 140 of the virtual coaching system 100. Additionally, while the virtual coaching system 100 has been described as including a single provider computing system 110, a single user computing device 120, a single variable display device 130 and a single third-party system 140, it is to be understood that the virtual coaching system 100 may include one or more of the same of differing versions of any of these components.

Figure 2:
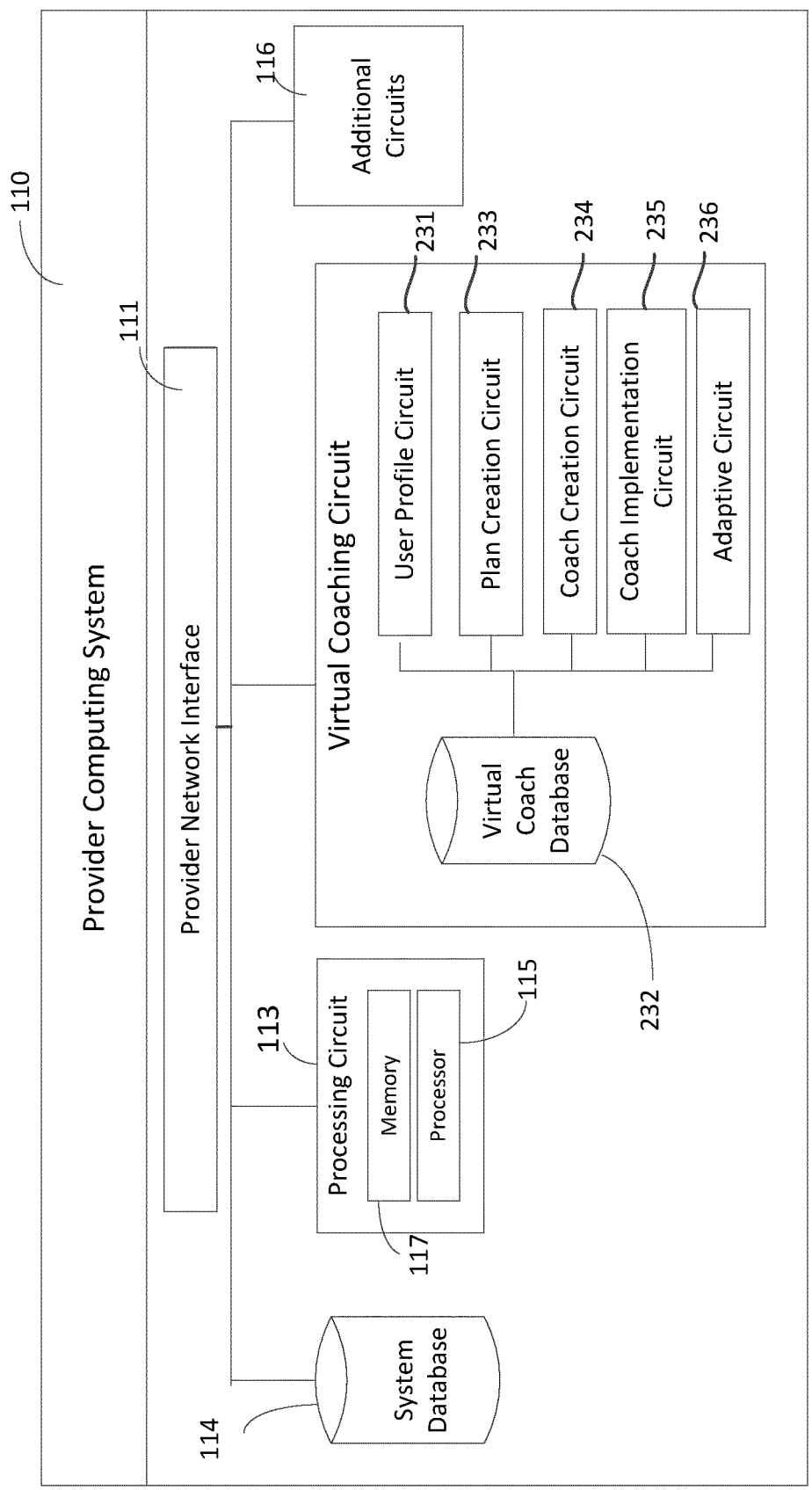
FIG. 2 is a diagram of the provider computing system set forth in FIG. 1 according to an example embodiment.

Referring to FIG. 2, a more detailed representation of the components of the provider computing system 110 is provided. As noted above, according to some arrangements, the provider computing system 110 is a computing system associated with a financial institution configured to create and provide a user with a user-specific virtual coach adapted to coach the user towards accomplishing his/her financial goal. In such arrangements, the user may or may not have a financial account at the financial institution associated with the provider computing system 110.

The provider computing system 110 includes a processing circuit 113, which may further include a processor 115 and one or more memory devices 117. The processor 115 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 117 (e.g., RAM, NVRAM, ROM, Flash Memory, hard disk storage, etc.) store data and/or computer code for facilitating the various processes described herein, and may be or include tangible, non-transient volatile memory or non-volatile memory. Accordingly, the one or more memory devices 117 may include database components, object code components, script components, or any other type of information structure for supporting the various activities and information structures described herein. For example, the processor 115 and one or more memory device 117 are configured to enable the provider computing system 110 to exchange data over the network 150, execute software applications, access websites, generate graphical user interfaces, and perform other operations. According to various arrangements, the processing circuit 113 of the provider computing system 110 is configured to store and provide the virtual coaching application 124 via which a user computing device 120 communicates information related to the virtual coaching circuit 112 with the provider computing system 110, According to various arrangements, the provider computing system 110 includes a provider network interface 111 enabling the provider computing system 110 to exchange data over the network 150, a virtual coaching circuit 112, and a system database 114. As shown in FIG. 2, according to various arrangements, the provider computing system 110 also optionally includes one or more additional circuits 116 configured to provide any number of additional services (e.g. mobile banking) that are offered by the provider.

The provider network interface 11 includes program logic that facilitates connection of the provider computing system 110 to the network 150. The provider network interface 111 supports communication between the provider computing system 110 and other systems, such as the user computing device 120, variable display device 130 and third-party system 140. According to various arrangements, the provider network interface 111 includes a cellular transceiver (e.g., Code Division Multiple Access (CDMA), Global System for Mobile Communications (GSM), Long-Term Evolution (LTE), etc.), a wireless network transceiver (e.g., 802.11X, ZigBee, Bluetooth, etc.), a radio-frequency identification (RFLD) transceiver, and a near-field communication (NFC) transmitter, or any combination thereof (e.g., both a cellular transceiver and a Bluetooth transceiver). In some arrangements, the provider network interface 111 includes hardware and machine-readable media sufficient to support communication over multiple channels of data communication. Further, in some arrangements, provider network interface 111 includes cryptography capabilities to establish a secure or relatively secure communication sessions with the other systems of the virtual coaching system 100, such as the user computing device 120, variable display device 130 and third-party system 140. In this regard, data (including, e.g., financial data) may be encrypted and transmitted to prevent or substantially prevent the threat of hacking.

The system database 114 allows the provider computing system 110 to retrievably store user information relating to the various operations discussed herein, and includes non-transient data storage mediums (e.g., local disc or flash based hard drives, local network servers, and the like) or remote data storage (e.g., cloud servers). The system database 114 includes information such as, but not limited to: personal user information (e.g., names, addresses, phone numbers, etc.), identification information (e.g., driver's license numbers, standard biometric data, etc.), user financial information (e.g., token information, account numbers, account balances, available credit, credit history, transaction histories, assets, etc.), user preferences, user goal(s)/plans, user profiles (e.g. social media presence, browsing histories, spending habits, etc.), etc.

The information stored in the system database 114 is obtained from any number of different sources. For example, any information and/or data obtained or created during use of the virtual coaching system 100 is saved to the system database 114. Additionally, in arrangements in which the user has or had an account with the provider associated with the provider computing system 110, the information stored in the system database 114 includes information originating with reference to the previously opened accounts with the provider. For example, in arrangements in which the provider is a financial institution, the additional accounts may include, e.g., a checking account, home loan, etc. In some arrangements, the information stored in the system database 114 also includes information and data obtained from uses of the user computing device 120 and/or third-party system 140 with provider computing system 110 unrelated to the virtual coaching system 100. According to various arrangements, the information stored in the system database 114 includes both information and data obtained directly and indirectly from the user.

The virtual coaching system 100 is intended to provide customized and tailored virtual coaching that can assist any number of different users in achieving their individual goals. As noted above, according to various arrangements, the types of goal(s) that the virtual coaching system 100 is used to assist a user in achieving include financial goals, which may range from financial goals that are very specific (e.g. purchasing a new car, paying for a wedding, going on a vacation, etc.), to general (e.g. retirement, setting up a college fund, etc.) to a broad goal of overall financial health.

In addition to being adapted to assist a user in achieving any variety of types of goals (e.g. specific, general or overall financial health), the virtual coaching system 100 is also configured to coach the user towards achieving his/her goals according to any number of different plans characterized by any number of different steps, timelines, urgencies, etc. that have been developed to lead the user towards realizing his/her goals. Furthermore, because individuals respond differently to various types of feedback, motivation, modes and methods of assistance, content, etc. the virtual coaching system 100 is adapted to utilize different approaches, personas, strategies, etc. in providing coaching, depending on the personality and traits of the user being coached.

The virtual coaching circuit 112 of the provider computing system 110 is embodied or at least partly embodied in the at least one memory device 117, with at least some operations being executable by the processing circuit 113. In general, the virtual coaching circuit 112 is configured to allow the virtual coaching system 100 to adapt as required based on goal/plan (i.e. the type of goal and the nature of the plan required to accomplish the goal) and/or user characteristics to provide the intended tailored and customized user-specific virtual coaching. To that effect, as illustrated in FIG. 2, the virtual coaching circuit 112 of the provider computing system 110 includes a user profile circuit 231, a plan creation circuit 233, a coach creation circuit 234, a coaching implementation circuit 235, a virtual coach database 232, and an optional adaptive circuit 236.

The user profile circuit 231 is configured to filter and narrow available user-specific information to obtain and provide to a requesting circuit (i.e. one or more of the other circuits of the virtual coaching circuit 112) a relevant subset of user-specific information based on a received request from the requesting circuit. User-specific information that is obtained by the user profile circuit 231 includes existing user-specific information that is readily available and accessible by the user profile circuit 231 ("existing information") and/or newly acquired and/or previously inaccessible user-specific information ("new information") that is made available in response to a request for such information from the user profile circuit 231.

Existing user-specific information that can be immediately accessed by the user profile circuit 231 includes information that can be obtained from the system database 114 and/or from the third-party system 140 over the network 150 via the provider network interface 111. The existing information available from the system database 114 includes information obtained in relationship with, e.g., existing or prior accounts held by the user with the provider, additional provider services utilized by the user, prior uses of the virtual coaching system 100 by the user, etc. Existing information available from the third-party system 140 includes, e.g., publicly available information obtained in relationship with existing or prior usage of the third-party system 140 by the user. Additionally, if the user had previously authorized the third-party system 140 to share private information from the third-party system 140 with the provider computing system 110, the existing information available to the user profile circuit 231 additionally, or alternatively, includes such private information.

As noted above, according to various arrangements, the user profile circuit 231 is also configured to request new information in response to a received request from a requesting circuit. Such new information includes information based on the usage of the third-party system 140 by the user that is not publicly available (such as, e.g., financial account information, a private social media account, a password-enabled computing device, etc.) and which the user had not previously authorized the third-party system 140 to share with the provider computing system 110.

In some arrangements, new information is also obtained by the user profile circuit 231 directly from the user via a request transmitted by the user profile circuit 231 over the network 150 using provider network interface 111 and to the user computing device 120. In such arrangements, the user profile circuit 231 is configured to transmit to the user computing device 120 any number of different surveys, user input fields, communications, questionnaires, calls, messages, recordings, or any other number of and combination of prompts to which the user responds/replies, and from which new information is obtained and provided to the requesting circuit. According to various arrangements, the prompts generated by the user profile circuit 231 and/or user responses to the prompts are transmitted between the user computing device 120 and the provider computing system 110 in the form of, e.g., a PDF or HTML document capable of being displayed on the user computing device 120, or via a graphical user interface generated by a virtual coaching application 124 accessed via the user computing device 120 in response the prompt received by the virtual coaching application 124 from the user profile circuit 231 over network 150.

The user-specific information accessible to the user profile circuit 231 (either as existing information or as new information) may include both explicit and implicit information. Explicit information is collected based on direct user interactions, and includes solicited information provided by the user in response to a direct prompt (e.g., user answers to surveys/questionnaires, information input by a user in an application during account set-up, preference settings input by a user, transcripts from chat sessions/call histories, etc.). According to various arrangements, explicit information is also collected based on unsolicited information shared by the user, e.g., user status updates provided by the user via social networking sites, user blog posts etc. Such explicit information is obtained by the user profile circuit 231 from saved user responses stored in the system database 114, from the third-party system 140, and/or in response to a prompt created by the user profile circuit 231. Implicit information includes user-specific information that is inferred based on monitored user behaviors and activities obtained from any number of different types of sources, such as, e.g., financial transactions, types of computing devices used by the user, physiological monitors, call/chat/text histories, information stored by cookies, mobile application utilization by the user, user web browsing histories, geolocation data associated with devices utilized by the user, social media usage/posts by the user, etc.

Instructions received by the user profile circuit 231 from a requesting circuit (the plan creation circuit 233, the coach creation circuit 234, or the coaching implementation circuit 235) include a request for user-specific information having a specific scope. Upon receiving the instructions form the requesting circuit, the user profile circuit 231 is configured to identify specific parameters by which the user profile circuit 231 filters and narrow all available user-specific information down to a small subset of relevant information that is to be provided to the requesting circuit. According to some arrangements, in addition to containing a request for user-specific information having a specific scope, the instructions from the requesting circuit also include additional variables by which the user profile circuit 231 is to filter user-specific information that is to be provided to the requesting circuit. Such variables may include limitations on, e.g., the source of the information, whether the user-information is to include existing information and/or new information, whether explicit and/or implicit information is desired, whether the user-specific information is to be limited to information related to a particular timeframe, etc.

As will be understood, according to various arrangements, as an alternative to (or in addition to) including user profile circuit 231, any or all of the requesting circuits may be configured to be capable of independently obtaining user information (including, e.g. existing, new, implicit and/or implicit information) as needed in a manner substantially similar to what has been described with regards to user profile circuit 231.

As will be described in greater detail below, the virtual coach database 232 allows the virtual coaching circuit 112 to retrievably store information relating to the various operations of the virtual coaching circuit 112 discussed herein, and includes non-transient data storage mediums (e.g., local disc or flash based hard drives, local network servers, and the like) or remote data storage (e.g., cloud servers). The virtual coach database 232 includes data, correlations, rules, etc. by which, e.g. parameters via which the user profile circuit 231 is to filter available user-specific data to obtain and provide relevant user-specific information to a requesting circuit is defined, data relevant to the creation of a plan, the selection of virtual coach persona traits, and manners in which the virtual coach is to assist/interact with the user is extracted by the logic of the plan creation circuit 233, coach creation circuit 234 and/or coaching implementation circuit 235; user progress towards a goal/implementation of the plan is assessed; etc.

The data, correlations, logic, or other contents of the virtual coach database 232 are user-created/defined and/or are based on processed data that has been aggregated from any number of different sources, including, e.g. the system database 114, third-party system 140, data aggregated and stored based on prior uses of the virtual coaching system 100 by the user or other individuals, etc. According to some arrangements, the contents of the virtual coach database 232 are generally static, with the virtual coach database 232 being updated only in response to pre-planned and/or user requested updates. In other arrangements, the virtual coach database 232 is adaptive, with the contents of the virtual coach database 232 being subject to real-time updates as new data/information is acquired/sensed by adaptive circuit 236, the system database 114, the third-party system 140 or any other source that further refines the ability of the virtual coach database 232 to assist in, e.g., structuring queries for user-specific information; correlating obtained user-specific information to data usable by the virtual coaching circuit 112 to better customize and tailor the virtual coaching to the user, providing content that is most effective in assisting the user in implementing a plan, monitoring the progress of a user toward a goal/implementing a plan, etc.

The plan creation circuit 233 is configured to create a plan intended to assist a user in realizing one or more goals of the user. According to various arrangements, the plan creation circuit 233 has varied levels of involvement in development of the plan. For example, in some arrangements, the plan creation circuit 233 merely serves as an interface that imports (e.g. via the network 150 using provider network interface 111) existing plan information, and makes the information related to the plan available and accessible to other portions of the virtual coaching circuit 112. In such arrangements, the plan creation circuit 233 is configured to instruct the user profile circuit 231 to obtain information indicative of the existence of a previously developed plan for a user. Examples of such existing plans and their sources include: plans stored in the system database 114 of the provider computing system 110 (e.g. a plan developed by a different, distinct additional circuit 116 of the provider computing system 110 that has been saved in the system database 114); plans imported from a third-party planning system that is provided by a device, system, program or network of the third-party system 140 via the provider network interface 111; etc. For example, in arrangements in which the provider is a financial institution, and the plan includes a financial plan for achieving one or more financial goals of the user, one example of a source of an existing financial plan may be a financial plan developed by a financial advisor of the financial institution and uploaded to the system database 114.

If no existing plan has been identified, and/or if a newly created plan is intended to replace or modify a previously developed plan, the logic of the plan creation circuit 233 is configured to create a plan for the user by identifying one or more goals of a user, assessing the criticality of the goal to the user, identifying steps and a timeline for how the goal is to be achieved, and optionally identifying parameters by which progress toward the goal is monitored.

According to some arrangements, goals of a user are identified by the plan creation circuit 233 in response to instructions being provided by the plan creation circuit 233 to the user profile circuit 231 to obtain explicitly provided user information related to the identification of one or more user goals. In such arrangements in which the explicit user-specific information requested is also requested to be based at least in part on new information, the user profile circuit 231 is configured to transmit over the network 150, via the provider network interface 111 and to the user computing device 120 a prompt in the form of, e.g., a PDF or HTML document capable of being displayed on the user computing device 120, a graphical user interface generated by a virtual coaching application 124 accessible by the user computing device 120, etc. with the prompt containing one or more requested user-input fields via which the user inputs information explicitly relevant to the identification of one or more goals of the user. According to various arrangements, the content of these user-input fields is based on parameters defined by the user profile circuit 231 at least partially in response to information stored in the virtual coach database 232.

According to some arrangements, the plan creation circuit 233 is configured to supplement (or entirely substitute) goals identified via explicit user input, with goals identified based on implicit user-specific information obtained by user profile circuit 231 based on one or both of existing or new information. Such an option is advantageous as it may, e.g., minimize the degree of direct user input or engagement required by the virtual coaching system 100 to provide virtual coaching to the user; be able to identify goals relevant to the user that the user was not able to identify him/herself; etc.

In particular, a user may not always be able to identify, recognize and/or effectively express or relay information regarding various self-attributes; may confound certain features as being indicative of specific attributes and/or identify desired, idealized, or expected future attributes instead identifying current, actual attributes; or may otherwise fail to accurately respond to prompts related to his/her own attributes. Accordingly, in some arrangements, in addition to (or as an alternative to) instructing the user profile circuit 231 to create a prompt to obtain new, explicitly provided information from the user, the user profile circuit 231 is instructed to obtain existing or new implicit information relevant to the identification of user goals. For example, in some arrangements, the prompt created and transmitted by the user profile circuit 231 to the user may also (or alternatively) contain one or more requested user-input fields via which the user inputs information implicitly relevant the identification of one or more goals of the user. According to various arrangements, the content of these user-input fields are based on parameters defined by the user profile circuit 231 at least partially in response to information stored in the virtual coach database 232, and includes input fields requesting the user to provide information related to, e.g. biographical information (e.g. age, marital status, gender, education level, race, address, profession, whether the user has children, etc.); various life and/or preferences (e.g. living arrangement preferences, traveling goals, spending habits, hobbies, etc.); user financial history (e.g. types of accounts, assets, debts, monthly financial obligations, etc.), current/future life goals (possible career changes, future education plans, anticipated future travel, having children, etc.); etc. As will be understood, if the identification of user goals is based in part or entirely on implicit user information, the identification of one or more user goals by the plan creation circuit 233 includes the additional step of utilizing the logic of the plan creation circuit 233 to extract data indicative of one or more goals based on the analysis of the implicit user information in light of information obtained from the virtual coach database 232.

As will be described in more detail below, according to some arrangements, an optionally included adaptive circuit 236 is configured to continuously aggregate data, which over the course of time is able to identify various goals that are applicable to the all users (e.g. financial goals that are applicable to the financial health of all users), irrespective of the background to the specific user. Accordingly, in some arrangements in which the virtual coach is to assist the user with achieving financial goals, instead of identifying specific user financial goals which the plan is intended to assist the user in achieving, the plan creation circuit 233 is configured to automatically assign to each user a financial goal of general financial health.

Once one or more goals of the user have been identified by the plan creation circuit 233, according to some arrangements, the steps and a timeline for how the goal is to be achieved, the assessment of the criticality of the goal, and parameters by which progress toward the goal is monitored are automatically identified by the plan creation circuit 233 based on information stored in the virtual coach database 232 correlating various goals to step and timelines for achieving such goals and/or parameters by which progress of the goal is monitored. In other arrangements, the plan creation circuit 233 is configured to identify one or both of the steps and a timeline for how the goal is achieved, and parameters by which progress toward the goal is monitored based on direct user input received, e.g., in response to a prompt generated and transmitted to the user computing device 120 over the network 150 and via the provider network interface 111, either directly by the plan creation circuit 233 or by the user profile circuit 231 in response to the receipt of instructions from the plan creation circuit 233.

Following the assessment of the criticality of the goal, the identification of the steps and a timeline for how the goal is achieved, and optional parameters by which progress toward the goal is monitored, the plan creation circuit 233 is configured to create the plan. According to some arrangement, the plan creation circuit 233 optionally provides the user the option to review and modify the plan prior to the plan being finalized and made available for use by the remaining circuits of the virtual coaching circuit 112.

The coach creation circuit 234 is configured to create a user-specific virtual coach having a persona defined by any number of customizable traits. In general, the coach creation circuit 234 is configured to allow the coach to be tailored and customized to increase the relatability of the virtual coach persona to the unique personality and needs of a specific user, so as to increase the likelihood that the user will react to and engage with the virtual coach, thereby improving the likelihood that the user will implement the created plan and realize his/her goal.

The persona of the virtual coach is defined by any number of traits, such as, e.g., personality, tone used by the coach, visual appearance, voice, etc. Examples of different virtual coach personality types include, e.g., personalities that are: friendly, encouraging, demanding/tough, stringent, informative, energetic, harsh, based on the personality of an existing person, etc. Examples of different types of tones that communications from the virtual coach is defined by include tones that are, e.g., informative, direct, succinct, encouraging, critical, humorous, brash, serious, passive, use positive and/or negative reinforcement, etc.

In some arrangements, the virtual coach takes the form of an avatar configured to be displayed to the user on the user computing device 120 and/or variable display device 130. In such arrangements, the persona of the virtual coach additionally includes the visual appearance and/or voice defining the avatar. The visual appearance of the avatar is customized to be, e.g., cartoon-like, realistic, based on a real or fictional person/character (e.g. the user, an age-progressed version of the user, a family member of the user, etc.). The voice of the avatar is customized to be, e.g., male/female, soft-spoken, authoritative, encouraging, inquisitive, angry, having an accent, etc.

The persona of the virtual coach is defined by the coach creation circuit 234 according to any number of different options. According to some arrangements, the customization of the coach persona is entirely based on direct user input. For example, a prompt is transmitted and capable of being displayed on the user computing device 120, or via a graphical user interface generated by a virtual coaching application 124 accessible by the user computing device 120 by the coach creation circuit 234 (either directly or via instructions provided to the user profile circuit 231) via which the user inputs selections of various traits that are to define the persona of the virtual coach. In arrangements in which the virtual coach is to be presented in the form of an avatar, the prompt provided to the user optionally provides the user the ability to import an existing user-created avatar (e.g. from a video game, etc.) on which the visual appearance, voice, and/or other personality traits of the virtual coach are to be based.

According to some arrangements, the virtual coach persona is defined entirely by the coach creation circuit 234. For example, in some arrangements an optionally included adaptive circuit 236 is configured to continuously aggregate data, which may over the course of time be able to identify a virtual coach persona defined by traits that is universally relatable to a wide range of users, irrespective of the background to the specific user, with the coach creation circuit 234 configured to define the persona of the virtual coach based on the identified universally relatable persona defined by the adaptive circuit 236. In other arrangements, the coach creation circuit 234 is configured to create a virtual coach persona defined by traits that are tailored to the personality or other traits of the user and/or to the plan of the user, with the coach creation circuit 234 being configured to analyze information related to the plan of the use (including, e.g. the identified goal(s), criticality of the goal, steps and timeline for achieving the goal) and/or existing user-specific information related to personality/traits of the user (obtained by the coach creation circuit 234 from the user profile circuit 231) in light of information from the virtual coach database 232 to identify various coach persona traits that are most suitable for the virtual coach.

Although obtaining direct user input as to the desired persona of the virtual coach allows for efficient customization of the virtual coach persona by the coach creation circuit 234, as discussed previously, a user may not always be able to identify, recognize and/or effectively express or relay information regarding various self-attributes; may confound certain features as being indicative of specific attributes and/or identify desired, idealized, or expected future attributes instead identifying current, actual attributes; or may otherwise fail to accurately respond to prompts related to his/her own attributes. Accordingly, in some arrangements, it is advantageous for the coach creation circuit 234 to define a virtual coach persona based on combined explicit and implicit user information. In such arrangements, the coach creation circuit 234 is configured to create an initial baseline virtual coach persona based on features that the coach creation circuit 234 has identified as being relevant to the user (e.g., in a manner such as, e.g. described in the preceding paragraph), with the coach creation circuit 234 being configured to allow the user to subsequently modify and customize the baseline virtual coach persona. According to some such arrangements, the manner in which the user is allowed to customize the baseline virtual coach persona is similar to that described in relation to the fully-user customizable arrangement. In other such arrangements, the customization of the baseline virtual coach persona is additionally, or alternatively, is based on new, implicit user-specific information obtained by the coach creation circuit 234 from the user profile circuit 231. According to some arrangements, the source of such new, implicitly user-specific information is based on monitored user activity and/or behavior from third-party system 140 and/or on direct user inputs to a prompt (e.g., a personality test) generated and provided to the user via the user computing device 120 by the user profile circuit 231. Upon the receipt of this new, implicit information, the logic of the coach creation circuit 234 is configured to analyze the obtained information in light of information from the virtual coach database 232 to infer one or more virtual coach persona traits that are relevant to the user.

The coaching implementation circuit 235 is configured to define the manner in which the virtual coach persona defined by the coach creation circuit 234 is to interact with/assist the user in implementing the plan created by the plan creation circuit 233. In particular, among other features, the coaching implementation circuit 235 is configured to determine the mode of delivery and timing of communications provided by the virtual coach; the degree of coaching provided by the coach; the content of the coaching provided by the virtual coach, etc. as best suited to and most effective in assisting the user.

As discussed previously, the user computing device 120 and the variable display device 130, which are used by the computing system to receive and present virtual coaching communications to the user includes any number of different devices which define any number of different types of channels by which any number of different types of communications (e.g. text messages, in-app text and/or messages/notifications, email, social network posts, phone calls, haptic feedback, etc.) are provided to the user. According to various arrangements, the coaching implementation circuit 235 is configured to utilize any number of feedback methods or systems to determine the types of channels and the types of communications via which virtual coaching communications are to be provided to the user, with the selection of the types of channels and/or types of communication by the coaching implementation circuit 235 being based on, e.g. monitored frequency and degree of usage of such channels and/or such communications and/or user responsiveness to such communications.

For example, according to various arrangements, the coaching implementation circuit 235 and/or the adaptive circuit 236 may monitor and store this data in the virtual coach database 232 along with monitored and observed user behaviors responsive to the use of such channels and modes of communication. Over time, the coaching implementation circuit 235 may use this saved historical data related to user usage of various channels and modes of communication and correlated user behavior and activity to identify, based on a desired effect of a particular coaching communication, a channel or mode of communication most likely to result effectuate the desired outcome.

By adjusting the types of channels used by the virtual coach and/or the types of communications that are transmitted to the user by the virtual coach based on the channels most commonly used by the user and/or the types of communications the user is most likely to respond and react to, the coaching implementation circuit 235 is configured to increase ability of relevant virtual coaching to reach the user, thereby increasing the effectiveness of the virtual coaching provided by the virtual coaching system 100.

The coaching implementation circuit 235 is configured to deliver virtual coaching communications to the user on a fixed, variable, and/or on an as needed schedule. According to various arrangements, the timing of delivery of communications determined by the coaching implementation circuit 235 is based on, e.g., a desired time interval between communications; a desired specific frequency of communications, detected and known periods of usage of the user computing device 120 and/or variable display device 130 by the user; avoiding delivery of messages during times of user unavailability (e.g. when the user has been detected as being at a movie theatre, etc.); specific time and/or dates (such as, e.g. upcoming due dates), a user-defined schedule (e.g. a user's lunch-break, etc.); a measured period of user inactivity, a sensed or monitored condition (e.g. access by the user to a particular website; the presence of the user at a specific location; etc.); etc. By adapting the timing of communications provided by the virtual coach based on when a particular communication is most relevant to a user, when a communication will most likely be considered by the user, and/or specific habits and preferences of the user, the coaching implementation circuit 235 is configured to increase the likelihood of the impact of the communication on the user, thereby increasing the effectiveness of the virtual coaching provided by the virtual coaching system 100.

The communications that are transmitted to user computing device 120 and/or variable display device 130 by the virtual coach are configured by the coaching implementation circuit 235 to contain content of any desired nature (e.g. text, audio, haptics, video, photos, etc.) intended for any number of different purposes. For example, the content selected by the coaching implementation circuit 235 includes content intended to, e.g. provide a user with an update of his/her progress towards a goal (e.g. graphs, charts, etc.); educate the user about a specific topic (e.g. written material and/or information video, etc.); remind the user of the user's plan and goals (e.g. an audio or haptic alert); provide encouragement to the user; motivate the user (e.g. a picture related to a goal of the user); remind the user of upcoming due dates; provide a link to a third-party system 140 application, system, network, etc. that is of use to the user (e.g. a link to a meal-planning mobile application in response to detected frequency and recurring fast-food charges); etc. According to various arrangements, the content transmitted to the user includes content obtained from any number of different sources, including, e.g. the virtual coach database 232, the system database 114, the user computing device 120, the variable display device 130, the third-party system 140, etc.

In addition to varying the content of the communications transmitted by the virtual coach, according to various arrangements, the coaching implementation circuit 235 is also configured to modify the degree with which the user is intended to engage with the content that is transmitted to the user. For example, some content (e.g. photos or messages sent to encourage the user) is configured to elicit no response from the user; some content (e.g. a message containing a visual depiction of the progress of the user) is not inherently intended to elicit a user response, but includes a link to document capable of being displayed on the user computing device 120; a graphical user interface generated by the virtual coaching application 124; and/or a website, via which the user uses to transmit to the virtual coaching circuit 112 any questions or concerns regarding the received communication the user has; while other content is configured to engage the user in a conversation (e.g. a display of the virtual coach avatar on the user computing device 120 with the displayed avatar inquiring how the user is doing and if the user has any suggestions or feedback related to the virtual coaching system 100).

According to various arrangements, the coaching implementation circuit 235 is configured to provide varying degrees and types of assistance to the user. By adapting the virtual coach to provide varying degrees and types of assistance to a user, the coaching implementation circuit 235 allows the virtual coaching system 100 to adapt to varying levels of coaching assistance that is desired by different users and/or varying levels of coaching assistance with which different user is comfortable. In some arrangements, the coaching implementation circuit 235 is configured to implement passive virtual coaching such as, e.g., reminding the user of to-do items and due dates related to a goal; providing the user with generic motivational communications; providing assistance in response to a user request for help, such as, e.g. providing information about specific questions, (e.g. what type of loan to apply for) or providing general, higher level information (such as, e.g. saving for retirement); providing the user information about changing trends related to the goal(s) of the user; etc.

In other arrangements, the coaching implementation circuit 235 is configured to adapt the virtual coach to provide a user with active assistance such as, e.g. providing real-time updates of the progress of the user towards his/her goal; transmitting personalized motivational communications; initiating a phone call to the user from a human advisor if the coaching implementation circuit 235 detects that the user is having trouble implementing his/her plan; providing suggestions, recommendations or tips to help the user based on the monitored user behavior (e.g., providing information regarding car purchasing and financing options in response to detecting an increase in frequency and amounts of charges related to car maintenance); putting financial decisions into context for a user in arrangements in which the goal is a financial goal (e.g. displaying via the user computing device 120 and/or variable display device 130 yearly costs spent on coffee purchases and the impact putting money spent on coffee towards savings would have on achieving a financial goal of the user in response to the coaching implementation circuit 235 receiving geolocation information from the user computing device 120 and/or third-party system 140 over the provider network interface 111 indicating that the user is at a coffee shop); proposing changes to the plan based on changes in the market in arrangements in which the user goal is a financial goal (e.g. recommending expediting the purchase of a home in response to information that interest rates will likely be increasing in the near future); providing a comparison of the situation and progress towards goals of the user in relationship to that of other users; etc.

According to yet other arrangements, the coaching implementation circuit 235 also is configured to adapt the virtual coach to provide proactive assistance to a user upon obtaining approval of the user to do, with the virtual coach in such arrangements being configured to independently take active measures towards helping the user implement his/her plan. For example, the coaching implementation circuit 235 is configured to transmit to the user computing device 120 and/or a third-party system 140 over the network 150 with instructions to block access by the user to the site of on online retailer that the user has indicated is a source of non-essential, impulse purchases that the user would like to avoid; to increase user accountability by, e.g. transmitting a message to a computing device or variable display device 130 of another individual pre-selected by the user (e.g. spouse/significant other, parent, etc.) in response to the user failing to implement the plan of the user; etc.

As will be understood, in arrangements in which the virtual coach is intended to provide active or proactive assistance to the user, the coaching implementation circuit 235 is configured to (or be configured to instruct the user profile circuit 231 to) monitor information related to current or on-going user activity from the user computing device 120, third-party system 140, an additional circuit 116 of the provider computing system 110, such that the coaching implementation circuit 235 customizes and tailors the virtual coaching provided to the user as much as possible by, e.g.: delivering communications via the most appropriate channels (e.g. determining, or doing a search to determine, by the coaching implementation circuit 235: communication channels most frequently used by the user; patterns related to the use and/or selection of communication channels by the user; whether the user is currently actively utilizing a particular channel prior to send a communication to that channel and adjusting the selected channel for delivery of the communication accordingly); delivering the communications at times at which the user is most likely to be receptive of the communication; adjusting the scope of the communications (e.g. sending communications with limited scope and/or communications not requiring a user response during working hours of the user); adapting the content of the coaching provided by the virtual coach (e.g. initiating a phone call with a human financial advisor of a financial institution in response to receiving data from the user computing device 120 that the user has accessed his/her retirement savings account and data from a smartwatch device of the user indicative of an elevated heart rate of the user in embodiments in which the virtual coach is configured to assist the user with achieving a financial goal at the provider is a financial institution); etc.

The manner in which the coaching implementation circuit 235 is configured to interact with/assist the user is varied according to various arrangements. For example, according to some arrangements, the coaching implementation circuit 235 is configured to instruct the user profile circuit 231 to obtain explicitly provided user information related to the identification of desired settings by which the virtual coach is to interact with/assist the user. In such arrangements in which the explicit user-specific information requested is also requested to be based at least in part on new information, the user profile circuit 231 is configured to transmit over the network 150, via the provider network interface 111 and to the user computing device 120 a prompt in the form of, e.g., a PDF or HTML document capable of being displayed on the user computing device 120, a graphical user interface generated by a virtual coaching application 124 available on the user computing device 120, etc. with the prompt containing one or more requested user-input fields via which the user inputs information explicitly relevant the identification of user preference related to virtual coach interactions/assistance. According to various arrangements, the content of these user-input fields is based on parameters defined by the user profile circuit 231 at least partially in response to information stored in the virtual coach database 232.

According to some arrangements, the coaching implementation circuit 235 is configured to supplement (or entirely substitute) user preferences identified via explicit user input, with user preferences identified based on implicit user-specific information obtained by user profile circuit 231 based on one or both of existing or new information. Such an option is advantageous as it may, e.g., minimize the degree of direct user input or engagement required by the virtual coaching system 100 to provide virtual coaching to the user; be able to identify user preferences that the user was not able to identify him/herself; etc.

In particular, a user may not always be able to identify, recognize and/or effectively express or relay information regarding various self-attributes; may confound certain features as being indicative of specific attributes and/or identify desired, idealized, or expected future attributes instead identifying current, actual attributes; or may otherwise fail to accurately respond to prompts related to his/her own attributes. Accordingly, in some arrangements, in addition to (or as an alternative to) instructing the user profile circuit 231 to create a prompt to obtain new, explicitly provided information from the user, the user profile circuit 231 is instructed to obtain existing or new implicit information relevant to the identification of user preferences related to virtual coach interactions/assistance. For example, in some arrangements, the prompt created and transmitted by the user profile circuit 231 to the user also (or alternatively) contains one or more requested user-input fields via which the user inputs information implicitly relevant to the identification of virtual coach interaction/assistance settings. As will be understood, if the identification of user coach interaction/assistance preferences is based in part or entirely on implicit user information, the identification of one or more user preferences by the coaching implementation circuit 235 includes the additional steps of utilizing the logic of the plan creation circuit 233 to extract data indicative of one or more user interaction/assistance preferences based on the analysis of the implicit user information in light of information obtained from the virtual coach database 232.

As will be explained in more detail below, according to various arrangements, as the user and other individuals are coached via the virtual coaching system, and as data related to the virtual coaching provided by the virtual coaching system 100 to the user and other individuals is aggregated and processed, the adaptive circuit 236 of the virtual coaching circuit 112 is configured to analyze the data to determine patterns related to, among other things, particular user-specific virtual coach traits and features that correlate with successful implementation of plans and achievement of goals by users of the virtual coaching system 100. As sufficient data is analyzed and such specific features and/or traits are identified by the adaptive circuit 236, according to some arrangements, the virtual coaching system 100 is configured such that certain traits and/or features of the virtual coach related to the manner in which the virtual coach interacts with/assists the user is preselected by the coaching implementation circuit 235 based on this information.

In arrangements in which the selections of virtual coach features related to the manner which the virtual coach interacts with/assists the user during the virtual coaching provided by the virtual coaching system 100 is not entirely based on direct user input, according to various arrangements, the selection of these features by the coaching implementation circuit 235 is based on one or both of the plan of the user (with the selection further being based on number or and any combination of the: goal(s), the steps involved in achieving the goal(s), the criticality of the goal(s), the timeframe for completing the goal(s), etc. defining the plan of the user) and the personality, habits, and other traits of the user. In such arrangements, the coaching implementation circuit 235 contains logic via which the coaching implementation circuit 235 is configured to determine the extent and influence that different parts of the plan and/or user traits have in the selection of features related to the manner which the virtual coach interacts with/assists the user during the virtual coaching. Once this determination is made, the coaching implementation circuit 235 instructs the user profile circuit 231 to obtain relevant user-specific information, following which those portion of the obtained relevant user-specific information and the plan of the user that the coaching implementation circuit 235 has decided to base the selection of features on are analyzed and processed in view of information from the virtual coach database 232 to extract data on which the coaching implementation circuit 235 defines the features by which the virtual coach is to interact with and assist the user.

In other arrangements in which features of the virtual coach defined by the coaching implementation circuit 235 are based on one or both of the plan of the user and the traits of the user, the coaching implementation circuit 235 is configured to instruct the user profile circuit 231 to obtain relevant user-specific information, following which all of the obtained user-specific information relevant to the selection of features related to the manner in which the virtual coach interacts with/assists the user and all of the plan information are processed and analyzed in light of the information from the virtual coach database 232, with the features that are to define the manner in which the virtual coach interacts with/assists the user (including the degree to which the plan information and the user-specific information are used to determine these selected features) being determined based on the data obtained based on this analysis.

As will be understood, the plan created by the plan creation circuit 233, the persona of the virtual coach created by coach creation circuit 234, and/or the manner in which the virtual coach is configured to assist/interact with the user as selected by the coaching implementation circuit 235 ('the features') is adjusted as desired over the course of use of the virtual coaching system 100 by the user. In some arrangements, the features initially selected during set-up of the virtual coaching system 100 remains static over the course of virtual coaching provided by the virtual coaching circuit 112. In other arrangements, the features initially selected during set-up of the virtual coaching system 100 are semi-static, with different features being assigned to apply to various aspects of the virtual coach/coaching under specific different circumstances, but with the initially selected features and the rules by which the initially selected features are applied remaining static and unchanged over the course of coaching provided by the virtual coaching circuit 112.

In yet other arrangements, the plan created by the plan creation circuit 233, the persona of the virtual coach created by coach creation circuit 234, and/or the manner in which the virtual coach is configured to assist/interact with the user as selected by the coaching implementation circuit 235 is entirely adaptive, with: different features being assigned to apply to various aspects of the virtual coach/coaching under specific different circumstances and the initially selected features and rules by which the initially selected feature are applied being capable of being varied over the course of virtual coaching provided by the virtual coaching circuit 112. In such arrangements, the plan created by the plan creation circuit 233, the persona of the virtual coach created by coach creation circuit 234, and/or the manner in which the virtual coach is configured to assist/interact with the user as selected by the coaching implementation circuit 235 each are capable of being updated and refined over the course of use of the virtual coaching system 100, so as to be able to refine the initially selected features based on new data (e.g. from the adaptive circuit 236, based on ongoing monitored user behavior/activity, etc.).

As previously noted, according to various arrangements, the virtual coaching circuit 112 optionally includes an adaptive circuit 236. As the user and/or other individuals utilize the virtual coaching system 100, the adaptive circuit 236 is configured to monitor and analyze data related to the use of the virtual coaching system 100 to determine patterns and correlations between: the created plan, the profile of the user, the persona of the virtual coach and/or the manner in which the virtual coach is configured to assist/interact with the user and the effectiveness of the virtual coaching provided by the virtual coach as measured, e.g. by quantitatively defined progress toward the goal, user-reported progress towards the goal, user responsiveness to the virtual coach (including user responsiveness to, e.g. different modes, frequency, and timing of communications, different types of content, different actions taken by the virtual coach, the persona of the coach, etc.); etc.

In response to any correlations, inferences, patterns, etc. being detected by the adaptive circuit 236, the data, logic, correlations or other content of the virtual coach database 232 is updated accordingly. According to some arrangements, the adaptive circuit 236 is also optionally configured to update the virtual coach database 232 based on aggregated data from other sources, such as, e.g. system database 114, third-party system 140, etc. or other sources of information relevant to the operation of the virtual coaching system 100. By updating the virtual coach database 232 with such additional, updated information that correlates, e.g. specific: monitored user behavior or activities, user traits, particular goals, plan timelines, assessed criticalities of goals; etc. with virtual coach traits and features (including, e.g. persona of the coach; mode, frequency, and timing of communications transmitted by the virtual coach, degree of and types of virtual coach interactions with a user, content of virtual coach communication) the effectiveness of the ability of the virtual coaching system 100 to provide user specific virtual coaching in the future is enhanced.

As referenced previously, according to some arrangements, when sufficient data has been collected, analyzed and correlated to specific plan and/or virtual coach features by the adaptive circuit 236, any or all of the plan creation circuit 233, the coach creation circuit 234, and/or the coaching implementation circuit 235 may each be configured to automatically operate based on default settings based on the data obtained by the adaptive circuit 236, allowing the user to receive customized virtual coaching without requiring a user to spend time or effort in setting up, customizing, or providing information that would otherwise be required to provide the user with a user-specific virtual coaching. In some such arrangements, the default settings of the plan creation circuit 233, the coach creation circuit 234, and/or the coaching implementation circuit 235 is based on data from the adaptive circuit 236 generated in response to the analysis by the adaptive circuit 236 of data aggregated from: the use of the virtual coaching system 100 by all users or, usage of the virtual coaching system 100 by the specific user; or the use of the virtual coaching system 100 by users of similar backgrounds (e.g. age, geographical location, marital status, income level, net worth, etc.).

Referring to FIG. 3, a method for providing user-specific virtual coaching is illustrated according to one arrangement. The method illustrated in FIG. 3 is performed by virtual coaching system 100 or any other system. In some arrangements, the method of FIG. 3 is performed at least partially offline.

At step 300, a request for virtual coaching is received by the virtual coaching system 100. According to various arrangements, the virtual coaching system 100 is provided and utilized as a standalone system, with the method for providing user-specific virtual coaching being provided and initiated in response to an independently received request received directly from a user, such as e.g. in response to a user downloading and installing the virtual coaching application 124 on a mobile device of the user. In other arrangements, an option to download the virtual coaching application 124 and/or otherwise access the virtual coaching system 100 is presented to a user in response to the user by a user of a secondary application, program or system, such as, e.g. a mobile banking application provided as an additional circuit 116 of the provider computing system 110, with user-specific virtual coaching being provided and initiated in response to the user accepting the option to access the virtual coaching system 100 presented by the secondary application, program or system. In yet other arrangements, the virtual coaching system 100 is provided as a part of a secondary application, program or system offered by an additional circuit 116 of the provider computing system 110 and/or a third-party system 140 (e.g. as part of an overall-life coaching application), with the user-specific virtual coaching being provided and initiated in response to the user of the secondary application, program or system by the user.

In response to receiving a request to provide virtual coaching to a user, at step 302, a plan is created for the user. The plan that is created is adapted to assist the user in achieving any number of and any combination of different types of goals, including financial goals that range from well-defined goals (e.g. purchasing a car); open-ended goals (e.g. spending less money on dining out); goals having specific associated end-dates (e.g. saving for a wedding); goals without a specific timeframe (e.g. creating an emergency fund); goals of differing criticalities (e.g. saving for retirement vs. creating a vacation fund); etc. In initiating the creation of the plan, the plan creation circuit 233 is configured to determine one of more goals of a user. After one or more of the goals of the user have been identified, the plan creation circuit 233 is configured to utilize the identified goa, as well as additional information, such as, e.g. the criticality of the goal(s) to the user, the difficulty of achieving the goal (based on, e.g. current customer spending, saving and investing habits, etc. in arrangements in which the goal is a financial goal), and time sensitivity to create a plan for the user. According to various arrangements, the additional information related to the goals of the user is input by the user via a virtual coaching application 124 stored by the user computing device 120, which is transmitted to the plan creation circuit 233 over the network 150.

At step 304, a baseline virtual coach having a persona and/or feature defining how the virtual coach is to interact with and/or assist the user is defined by the coach creation circuit 234 and/or coaching implementation circuit 235. In particular, one or both of the coach creation circuit 234 and/or coaching implementation circuit 235 optionally instructs the user profile circuit 231 to obtain user-specific information related to the personality of the user and/or virtual coach interaction/assistance preferences of the user. In response to receiving requests from the coach creation circuit 234 and/or coaching implementation circuit 235, the user profile circuit 231 obtains parameters from the virtual coach database 232 by which the user profile circuit 231 filters available user-specific information to obtain subset(s) of information related to the personality of the user and/or virtual coach interaction/assistance preferences of the user and which can be provided to the requesting coach creation circuit 234 and/or coaching implementation circuit 235. Upon receipt of the requested information, the logic of the coach creation circuit 234 and/or the logic of the coaching implementation circuit 235 analyzes the received personality of the user and/or virtual coach interaction/assistance preferences of the user against information from the virtual coach database 232 to identify various virtual coach persona traits and/or virtual coaching features by which the virtual coach is to interact with/assist the user. Based on this information identified by the coach creation circuit 234 and/or the coaching implementation circuit 235, a baseline virtual coach model can be created.

According to various arrangements, at step 304, the user-specific information search by the user profile circuit 231 is defined by existing information, with the parameters identified by the user profile circuit 231 being configured to, among the types of information, obtain information related to, e.g. the digital interaction footprint of the user (related to user interactions with others), traits of the user identified from prior questions/conversation, passive chat session, the syntax of user communications (e.g. whether full sentences of used, or if slang or text language is used), types of words used by the user (e.g. emotion, analytical), social network data, geolocation data.

At step 306, the coach creation circuit 234 and/or the coaching implementation circuit 235 presents to the user (via, e.g. a graphical user interface displayed by virtual coaching application 124 accessed by the user computing device 120) the virtual coach persona traits and/or virtual coaching features by which the virtual coach is to interact with/assist the user of the baseline virtual coach model is defined for user review. According to various arrangements, in addition to providing the features of the baseline virtual coach model for approval, the coach creation circuit 234 and/or the coaching implementation circuit 235 also allows the user to modify virtual coach persona traits and/or virtual coaching features by which the virtual coach is to interact with/assist the user. For example, among the selections that is presented to the user for customization are: the tone of the coach (including, e.g. whether the coach is to utilize positive and/or negative reinforcement); the type of langue used by the coach, the channel used by the coach for interacting with the user (e.g. SMS/text message, voice calls, email, social media, digital assistant, etc.); the frequency of virtual coach communications; the amount of feedback to be provided by the virtual coach; content-related preferences (e.g. whether the user prefers communications containing words, picture, graphs, video, audio, etc.). Upon receipt by the coach creation circuit 234 and/or the coaching implementation circuit 235 of user selections (obtained, e.g. via the graphical user interface), baseline virtual coach model is updated as needed to create a finalized user-specific virtual coach.

Figure 4A:
FIGS. 4A-4C are diagrams illustrating an interactive display for customizing the features of a virtual coach by a user, according to an example embodiment.
Figure 4B:
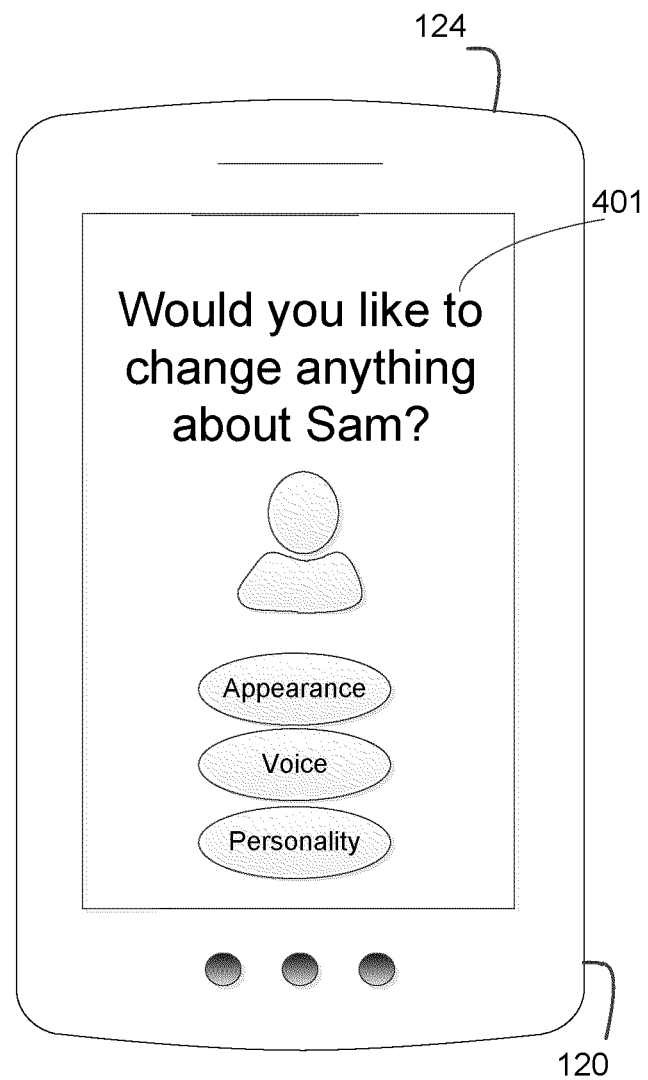
Figure 4C:
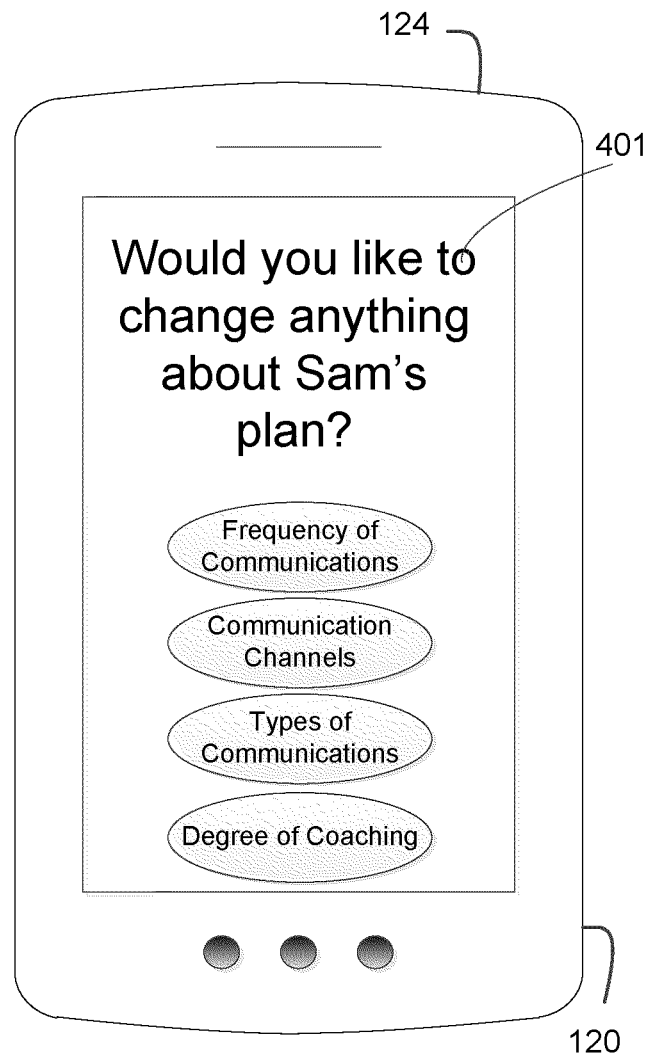

Referring to FIGS. 4A-4C, screenshots of representative graphical user interfaces 401, 402, 403 used in the baseline coach and/or financial plan customization process are shown according to one arrangement. As illustrated by FIGS. 4A-4C, according to some arrangements, the option to review and customize the baseline coach and/or financial plan created by the virtual coaching system 100 is provided via one or more graphical user interfaces displayed in the user computing device 120. As shown by the embodiment depicted in FIG. 4A, according to various arrangements, an initial customization graphical user interface displays the baseline virtual coach avatar and provides the user with one or more selectable options via which the user can review and/or modify the virtual coach and/or created financial plan. Although in the arrangement represented in FIG. 4A the virtual coach is displayed as a static image with communications directed to user being presented via text displayed in the user interface, according to other arrangements, the virtual coach is animated on the display, with the text-based communication displayed in FIG. 4A (or any other desired communication targeted to the user) being optionally being communicated to the user in the form of the avatar speaking to the user.

According to various arrangements, (such as, e.g. when the virtual coaching system 100 detects that the display window of the user computing device 120 in which the graphical user interface will be displayed is of a sufficient size) the ability to review, select, or otherwise customize different traits or features of the virtual coach and/or financial plan is provided by one or more objects (e.g. radial buttons, check boxes, icons, sliding scales, etc.) that are displayed on and selectable from the initial graphical user interface displayed in the user computing device 120. However, as illustrated by the embodiments shown in FIGS. 4B and 4C, according to other arrangements (such as, e.g. when the virtual coaching system 100 detects that the user computing device 120 being used by the user to customize and review the baseline virtual coach and financial plan comprises a device with a small screen size, such as, e.g. a smartphone, that would make it difficult to display the desired amount of selectable features to the user) one or more selectable options are provided on the initial customization screen, with the selection by the user of an option being configured to generate new graphical user interface. For example, in response to a user selecting the "Find out about Sam" option in the graphical user interface of FIG. 4A, the virtual coaching circuit 12 is configured to generate a second graphical user interface such as illustrated, e.g., in FIG. 4B. Alternatively, by selecting the "Find out about Sam's Plan" option displayed in the graphical user interface of FIG. 4A, the virtual coaching circuit 112 is configured to generate a third graphical user interface such as illustrated, e.g., in FIG. 4C. As will be understood, each of the generated graphical user interfaces may themselves also include selectable options, which in turn also generate and result in graphical user interfaces being displayed by the user computing device 120.

At step 308, a coaching plan is optionally provided to the user by the virtual coaching circuit 112, with the coaching plan being based on and summarizing to the user the created plan, created virtual coach persona, and selected features defining the manner in which the virtual coach is to interact with and assist the user. The coaching plan optionally provides the user with the opportunity to update and edit any and all of the created plan, created virtual coach persona, and selected features defining the manner in which the virtual coach is to interact with and assist the user as needed.

Although the coach creation circuit 234 and the coaching implementation circuit 235 have been referred to as distinct circuits functioning independently of one another, it is to be understood that according to some arrangements, the coach creation circuit 234 and the coaching implementation circuit 235 comprises a single circuit, with the selection of virtual coach persona traits and virtual coaching features by which the virtual coach is to interact with/assist the user being identified simultaneously by the combined circuit.

Figure 5:
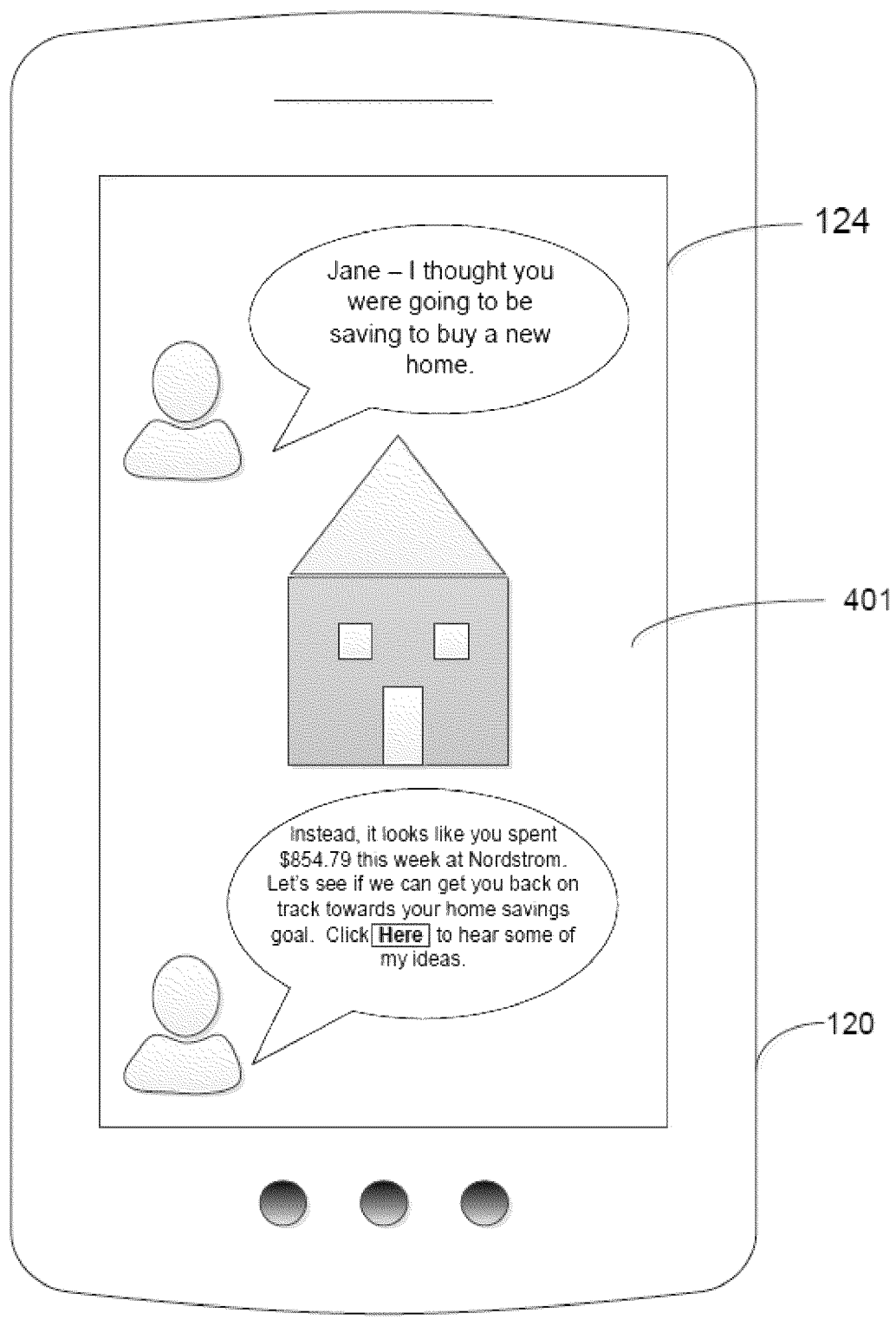
FIG. 5 is a diagram illustrating a communication from the virtual coaching system, according to an example embodiment.

At step 310, the virtual coaching system 100 is used to provide virtual coaching to the user according to the coaching plan by: providing communications in a manner defined by the features selected by the coaching implementation circuit 235 using a coach personality as defined by the coach creation circuit 234 to assist the user in following the plan created by the plan creation circuit 233. For example, illustrated in FIG. 5 is one arrangement of a virtual coach communication created by and transmitted to a graphical user interface displayed by the mobile virtual coaching application 124 in the user computing device 120 in response the coaching implementation circuit 235 receiving information from the system database 114 of the provider computing system 110 that the user has incurred unexpected significant charges in a financial account of the user, with the avatar and the tone of the communication created by the coaching implementation circuit 235 being based on a virtual coach persona created by the coach creation circuit 234.

According to various arrangements, at step 312, during the course of the virtual coaching provided to the user, any or all of the plan creation circuit 233, the coach creation circuit 234 and the coaching implementation circuit 235 is configured to monitor (or instruct the user profile circuit 231 to monitor) ongoing user activity and behavior based on user usage of user computing device 120, third-party system 140, and/or additional circuits 116 of the provider computing system 110.

According to various arrangements, at step 314, the adaptive circuit 236 reviews and analyzes the monitored data obtained during step 312 to determine the effectiveness of the virtual coaching provided by the virtual coaching system 100. Based on this analysis, the adaptive circuit 236 may modify the virtual coaching system 100 to better tailor the virtual coach to the user, with any such updates being stored in the virtual coach database 232 so as to be available for future use by the virtual coaching system 100. As will be understood, steps 312 and 314 may be repeated any number of times and with any desired frequency over the course of providing virtual coaching to the user (e.g., in response to each coaching action provided by the virtual coach and/or each interaction of the coach with a user, etc.).

According to some arrangements, the virtual coach database 232 may store correlations between different types of coaching that may be provided by the virtual coach and one or more expected user behaviors or activities that are to be monitored to assess the effectiveness of each type of coaching. By monitoring these expected user behaviors and activities, the adaptive circuit 236 may be able to fine-tune and improve the coaching provided by the virtual coach to increase the likelihood that the various coaching undertaken by the virtual coaching system 100 will elicit the desired behavior/actions/changes/etc. in a user.

For example, as discussed previously, in one arrangement the virtual coach transmits to a user having a goal of saving money a message encouraging the user to reconsider a coffee purchase in response to determining the geolocation of the user to be in the vicinity of a coffeeshop. For this particular type of coaching, the virtual coach database 232 may indicate that the expected user behaviors and activities that should be monitored are the geolocation of the user and/or transactions that are posted in the financial accounts of the user within a predetermined time period subsequent to the transmission of the coaching message to the user. Based on this information from the virtual coach database 232, the user profile circuit 231 may monitor subsequent user geolocation data and/or user financial statements to determine whether the message was effective in preventing the user from purchasing coffee (as would, e.g., be indicated by a lack of a posted coffeeshop transaction and/or a failure to detect the geolocation of the user within the vicinity of the coffeeshop within a predetermined time period).

As another example, in some arrangements the coaching provided by the virtual coach may comprise a communication transmitted to the user computing device 120 and/or variable display device 130 encouraging the user to set aside a certain amount of money from each paycheck towards a savings account. In such arrangements, the correlation stored in the virtual coach database 232 may indicate that the user behavior and/or activity to be monitored for such a coaching activity may comprising monitoring the financial accounts of the user to determine whether money has been deposited into a savings account.

In response to detecting (or not detecting as may be the case) the one or more expected user behaviors or activities associated with a particular type of coaching, the adaptive circuit 236 may, over time, update the virtual coach database 232 to indicate the particular type of coaching as being effective in encouraging/preventing a targeted user behavior, with the coach implementation circuit 235 being configured to coach the user in a similar manner should a similar situation arise in the future. For example, in the hypothetical presented above, in response to determining that the user did not enter the coffeeshop and/or that no transaction from the coffeeshop was posted to a financial account of the user, the adaptive circuit 236 may update the virtual coach database 232 to indicate the type of message that was sent to the user as an effective coaching action.

According to some arrangements, in response to determining that a particular type of coaching failed to meet a minimum threshold of effectiveness and/or that the coaching was detrimental to achieving a desired user behavior, the adaptive circuit 236 updates the virtual coach database 232 to indicate such coaching as ineffective so that that particular type of coaching is not used again by the virtual coaching system 100. However, in other situations, the adaptive circuit 236 may determine that-despite not meeting a desired threshold effectiveness, the coaching demonstrated some degree of effectiveness in coaching a user. In such scenarios, the adaptive circuit 236 may determine that instead of entirely dismissing the coaching type as ineffective, certain modifications to one or more of the characteristics defining the coaching (e.g., the tone of the message, the content of the message, the user computing device(s) 120 and/or variable display device(s) 130 to which the coaching was provided, the timing of the coaching, etc.) may be sufficient to increase the effectiveness of the coaching to make the particular coaching action a viable coaching action for future uses of the virtual coaching system 100.

As will be understood, the assessment of how certain characteristics defining a coaching action should be modified may be more objective for certain characteristics than for others. For example, in modifying which user computing device(s) 120 to transmit coaching communications to, the adaptive circuit 236 may rely on objective data related to the monitored usage of various user computing device(s) 120. Similarly, in modifying the timing of user communications, the adaptive circuit 236 may also rely on objective data related to various monitored user behaviors and/or activities. Accordingly, despite involving a significant, change to the characteristic of the coaching action, such a modification may nonetheless be desirable to test in an attempt to increase the effectiveness of the coaching provided by the virtual coaching system 100.

In contrast, for characteristics that cannot easily be objectively monitored, such as, e.g., the effect of the tone and/or content of the coaching action on user behavior, according to various arrangements it may be undesirable to make significant, binary modifications to such coaching action characteristics, as such drastic changes to these characteristics may serve to worsen, rather than improve the effectiveness of the coaching. For example if, in the above presented hypothetical, the tone of the coaching message to set money aside from each paycheck were suddenly changed from an encouraging tone to a strict one, a user not expecting such a change may react by altogether ignoring the coaching message. Accordingly, in such arrangements in which the tone and/or content of the message of the coaching is to be modified, it may be advantageous to initially attempt to increase the effectiveness of the coaching message by making adjustments to the level of the tone and/or content of the coaching message (e.g. adding a degree of strictness to the tone of the coaching message while retaining at least some of the encouraging tone of the message) rather than making an altogether binary change in the tone and/or content of the coaching message.

As described above, according to various arrangements the adaptive circuit 236 provides a feedback system that operates in an iterative manner to continuously refine the operation of the virtual coaching system so as to determine the most effective combination to various virtual coach characteristics (e.g., the tone of the message, the content of the message, the user computing device(s) 120 and/or variable display device(s) 130 to which coaching is provided, the timing of the coaching, etc.) with which to coach a user. As part of this process, with each use of the virtual coach to provide coaching to the user, the specifics of each coaching activity may be recorded in the virtual coach database 232 for future reference. For example, recorded for each coaching event may be information such as: the overall user goal and/or financial plan; the characteristics of the particular coaching message; the purpose of the coaching message (e.g. whether the coaching event was: a prescheduled check-in; intended to remind the user of a specific event/task to be completed; sent in response to a monitored user event (e.g. congratulate the user for reaching a goal, check-in with the user regarding unusual activity, etc.); etc.

Subsequent to a coaching event, one or more user behaviors or activities may be monitored by the adaptive circuit 236 to assess the effectiveness of the coaching activity. As noted above, according to various arrangements, stored by the virtual coach database 232 may be previously provided correlations (either from prior uses of the virtual coaching system and/or from other sources) that relate a specific type of coaching message and/or one or more coaching message characteristics to expected user behaviors or activities. These correlations allow the adaptive circuit 236 to determine whether the particular coaching event elicited the intended response in a user. According to some arrangements, as additional user behaviors and activities are monitored and compared against particular coaching messages, the adaptive circuit 236 may continue to update the correlations stored by the virtual coach database 232, allowing the virtual coach system to better assess the effectiveness of the coaching provided to the user.

As the adaptive circuit 236 updates the virtual coach database 232 with information regarding coaching events and subsequent monitored user behavior and activity, the adaptive circuit 236 may apply any number of different analytics to the aggregated data to extract and refine various correlations between virtual coaching characteristics and resulting user behavior. Based on this data stored in the virtual coach database 232, over time, the coach implementation circuit 235 may be able to provide more precise and refined coaching by being able to define coaching communications using a specific mix of characteristics that have been determined by the adaptive circuit 236 as being most likely to elicit a specific intended user behavior or response.

At step 316, the virtual coaching system 100 receives a new request for virtual coaching (either from the user or another individual). With the additional data obtained during step 312 stored in the virtual coach database 232 (as well as any additional updates that have been made to the virtual coach database 232, such as, e.g. information added based on the use of the adaptive circuit 236 at step 314), the virtual coaching system 100 is configured to provide increasingly refined and specific information that is used to provided increasingly tailored virtual coaching requiring decreasing amounts of direct user input.

The arrangements described herein have been described with reference to drawings. The drawings illustrate certain details of specific arrangements that implement the systems, methods, and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors embodied in various ways. The one or more processors constructed in a manner sufficient to perform at least the operations described herein. In some arrangements, the one or more processors shared by multiple circuits (e.g., circuit A and circuit B may comprise or otherwise share the same processor which, in some example arrangements, may execute instructions stored, or otherwise accessed, via different areas of memory). Alternatively or additionally, the one or more processors structured to perform or otherwise execute certain operations independent of one or more co-processors. In other example arrangements, two or more processors coupled via a bus to enable independent, parallel, pipelined, or multi-threaded instruction execution. Each processor implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors external to the apparatus, for example the one or more processors a remote processor (e.g., a cloud based processor). Alternatively or additionally, the one or more processors internal and/or local to the apparatus. In this regard, a given circuit or components thereof disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described to explain the principals of the disclosure and its practical application to enable one skilled in the art to utilize the various arrangements and with various modifications as are suited to the particular use contemplated. Other substitutions, modifications, changes, and omissions may be made in the design, operating conditions, and arrangement of the arrangements without departing from the scope of the present disclosure as expressed in the appended claims.

We claim:

1. A method of providing virtual financial coaching to a user comprising:
   obtaining, by a provider computing device, personal information related to the user;
   analyzing, by a user profile circuit of the provider computing device, the personal information that identifies one or more traits of the user;
   creating, by the provider computing device, a baseline virtual coach having one or more coach features, wherein at least one of the coach features is based on at least one trait of the user;
   transmitting, by the provider computing device, a graphical user interface that displays a mobile application on a display of a user device, the graphical user interface including one or more user options where the user selects one or more features that are to define a custom user virtual coach;
   creating, by the provider computing device, the custom user virtual coach based on features of the baseline virtual coach and one or more feature selections received from the user, comprising:
   receiving, from the user via the mobile application, the one or more feature selections relating to the baseline virtual coach;
   receiving, from the user via the mobile application, a financial goal of the user;
   setting, based on the selections and the financial goal, one or more items, the one or more items being at least one of a tone of communications, a positive or negative reinforcement scheme for the communications, a type of language used in the communications, an amount of feedback to provide the user, and a content type preference for the communications;

modifying, by the provider user device, the one or more features of the baseline virtual coach based on the financial goal in accordance with the one or more items; and generating, by the provider computing device, the custom user virtual coach comprising the one or more modified features; feature selections received from the user;

determining, by the provider computing device, based on the personal information of the user and one or more selections made by the user, a financial goal of the user;

generating, by the provider computing device, a communication to the user containing information related to the financial goal of the user, wherein at least one feature of the communication is generated based on a modified feature of the custom user virtual coach;

monitoring, by a coaching implementation circuit of the provider computing device, a usage frequency of each channel in a plurality of communication channels;

selecting, by the coaching implementation circuit, based at least in part on the usage frequency, a communication channel from the plurality of communication channels;

determining, by the coaching implementation circuit, at least one monitored period of user usage of the display of the user device;

determining, by the coaching implementation circuit, a communication schedule, wherein the communication schedule is based on at least a desired time interval between communications, the at least one monitored period of user usage of the display of the user device, and geolocation data received from the user device;

sending, via the communication channel and according to the communication schedule, by the provider computing device, the communication to a display device associated with the user;

determining, by an adaptive circuit, at least one expected user behavior responsive to the communication sent to the display device; analyzing, by the adaptive circuit, the geolocation data and a transaction history of the user during a predetermined interval occurring after the communication sent to the display device;

assessing, by the adaptive circuit, an effectiveness of the custom user virtual coach corresponding to the financial goal of the user, the assessment based at least in part on the at least one expected user behavior and the analysis of the geolocation data and the transaction history of the user;

determining, by the adaptive circuit, at least one feature of the custom user virtual coach to modify, the determined modification based on the assessment of effectiveness corresponding to the financial goal of the user; and modifying, by the adaptive circuit, the at least one feature of the custom user virtual coach.

2. The method of claim 1, wherein the one or more personal traits of the user are obtained by the provider computing device from a source of user personal information that is stored by an account database of the provider computing device.

3. The method of claim 1, wherein the one or more personal traits of the user are obtained by the provider computing device from a source of user personal information that has been obtained through monitored usage of a computing device by the user.

4. The method of claim 1, wherein at least one of a content of the communication, the display device to which the communication is delivered, and a timing of when the communication is transmitted to the display device is selected based on a feature of the custom user virtual coach.

5. The method of claim 1, wherein the display device is the same as the user device.

6. The method of claim 1, wherein the display device is different than the user device.

7. The method of claim 6, the method comprising:
identifying, by the provider computing device, one or more benchmarks by which progress of the user towards achieving the financial goal is measured;
determining, by the provider computing device, whether a benchmark from the one or more identified benchmarks has been met;
in response to determining that the benchmark has not been met, sending, by the provider computing device, an update communication to one of the display device and the user device; and
in response to determining that the benchmark has been met, sending, by the provider computing device, an update communication to the other of the display device and the user device.

8. The method of claim 7, the method comprising updating, by the provider computing device, a coaching database with information as to whether the benchmark has been met and information related to the features defining the custom user virtual coach.

9. The method of claim 1, wherein the communication comprises a message that is configured to be displayed on a screen of the display device, the communication including an avatar defined by visual characteristics that are based on at least one feature of the custom user virtual coach.

10. The method of claim 1, the method comprising updating the features of the custom user virtual coach in response to newly identified user personal information being obtained by the provider computing device, wherein the newly identified user personal information is obtained through continued monitored usage of a computing device associated with the user.

11. A system for providing virtual financial coaching:
obtain, by a provider computing device, personal information related to a user;
analyze, by a user profile circuit of the provider computing device, the personal information that identifies one or more traits of the user;
create, by the provider computing device, a baseline virtual coach having one or more coach features, wherein at least one of the coach features is selected based on at least one identified trait of the user;
transmit, by the provider computing device, a graphical user interface displayed by a mobile application on a display of a user device associated with the user, the graphical user interface including one or more user selectable options allowing the user to select one or more features that are to define a custom user virtual coach;
create, by the provider computing device, the custom user virtual coach based on features of the baseline virtual coach and the one or more feature selections received from the user, comprising:
receive, from the user via the mobile application, the one or more feature selections relating to the baseline virtual coach:
receive, from the user via the mobile application, a financial goal of the user:
set, based on the selections and the financial goal, one or more items, the one or more items being at least one of a tone of communications, a positive or negative reinforcement scheme for the communications, a type of language used in the communications, an amount of feedback to provide the user, and a content type preference for the communications:
modifying one or more features of the baseline virtual coach based on the financial goal in accordance with the one or more items; and
generating, by the provider computing device, the custom user virtual coach comprising the one or more modified features;
generate, by the provider computing device, a communication to the user containing information related to the financial goal of the user, wherein at least one feature of the communication is generated based on a modified feature of the custom user coach;
monitor, by a coaching implementation circuit of the provider computing device, a usage frequency of each channel in a plurality of communication channels associated with the user;
select, by the coaching implementation circuit, based at least in part on the usage frequency, a communication channel from the plurality of communication channels;
determine, by the coaching implementation circuit, at least one monitored period of user usage of the display of the user device;
determine, by the coaching implementation circuit, a communication schedule, wherein the communication schedule is based on at least a desired time interval between communications, the at least one monitored period of user usage of the display of the user device, and geolocation data received from the user device;
send, via the communication channel and according to the communication schedule, the communication to a display device associated with the user;
determine, by an adaptive circuit of the provider computing device, at least one expected user behavior responsive to the communication sent to the display device;
analyze, by the adaptive circuit, the geolocation data and a transaction history of the user during a predetermined interval occurring after the communication sent to the display device;
assess, by the adaptive circuit, an effectiveness of the custom user virtual coach corresponding to the financial goal of the user, the assessment based at least in part on the at least one expected user behavior and the analysis of the geolocation data and the transaction history of the user;
determine, by the adaptive circuit, at least one feature of the custom user virtual coach to modify, the determined modification based on the assessment of effectiveness corresponding to the financial goal of the user
modify, by the adaptive circuit, the at least one feature of the custom user virtual coach.

12. The system of claim 11, wherein the one or more personal traits of the user are obtained from a source of user personal information that is stored by an account database of a provider computing system.

13. The system of claim 11, wherein the one or more personal traits of the user are obtained from a source of user personal information that has been obtained through monitored usage of a computing device by the user.

14. The system of claim 11, wherein at least one of a content of the communication, the display device to which the communication is delivered, and a timing of when the communication is transmitted to the display device is selected based on a feature of the custom user virtual coach.

15. The system of claim 11, wherein the display device is the same as the user device.

16. The system of claim 11, wherein the display device is different than the user device.

17. The system of claim 16, wherein the system is configured to:
identify one or more benchmarks by which progress of the user towards achieving the financial goal is measured;
determine whether a benchmark from the one or more identified benchmarks has been met;
in response to determining that the benchmark has not been met, send an update communication to one of the display device and the user device; and
in response to determining that the benchmark has been met, send an update communication to the other of the display device and the user device.

18. The system of claim 11, wherein the communication comprises a message that is configured to be displayed on a screen of the display device, the communication including an avatar defined by visual characteristics that are based on at least one feature of the custom user virtual coach.

19. The system of claim 11, the system configured to update the features of the custom user virtual coach in response to new user personal information being obtained through continued monitored usage of a computing device by the user.

20. A non-transitory computer-readable medium having processor-readable instructions stored thereon such that, when executed by a processor, cause the processor to:
obtain, by a provider computing device, personal information related to a user;
analyze, by a user profile circuit of the provider computing device, the personal information that identifies one or more traits of the user;
create, by the provider computing device, a baseline virtual coach having one or more coach features, wherein at least one of the coach features is selected based on at least one trait of the user;
transmit, by the provider computing device, a graphical user interface that displays a mobile application on a display of a user device associated with the user, the graphical user interface including one or more user selectable options allowing the user to select one or more features that are to define a custom user virtual coach:
create, by the provider computing device, the custom user virtual coach based on features of the baseline virtual coach and one or more feature selections received from the user, comprising:
receiving, from the user via the mobile application, the one or more feature selections relating to the baseline virtual coach:
receiving, from the user via the mobile application, a financial goal of the user:
setting, based on the selections and the financial goal, one or more items, the one or more items being at least one of a tone of communications, a Positive or negative reinforcement scheme for the communications, a type of language used in the communications, an amount of feedback to provide the user, and a content type preference for the communications:
modifying one or more items; and
generating the custom user virtual coach comprising the one or more modified features;
generate, by the provider computing device, a communication to the user containing information related to the financial goal of the user, wherein at least one feature of the communication is generated based on a modified feature of the custom user virtual coach;

monitor, by a coaching implementation circuit of the provider computing device, a usage frequency of each channel in a plurality of communication channels associated with the user;

select, by the coaching implementation circuit, based at least in part on the usage frequency, a communication channel from the plurality of communication channels;

determine, by the coaching implementation circuit, at least one monitored period of user usage of the display of the user device;

determine, by the coaching implementation circuit, a communication schedule, wherein the communication schedule is based on at least a desired time interval between communications, the at least one monitored period of user usage of the display of the user device, and geolocation data received from the user device;

send, via the communication channel and according to the communication schedule, the communication to a display device associated with the user;

determine, by an adaptive circuit of the provider computing device, at least one expected user behavior responsive to the communication sent to the display device;

analyze, by the adaptive circuit, the geolocation data and a transaction history of the user during a predetermined interval occurring after the communication sent to the display device;

assess, by the adaptive circuit, an effectiveness of the custom user virtual coach corresponding to the financial goal of the user, the assessment based at least in part on the at least one expected user behavior and the analysis of the geolocation data and the transaction history of the user;

determine, by the adaptive circuit, at least one feature of the custom user virtual coach to modify, the determined modification based on the assessment of effectiveness corresponding to the financial goal of the user; and modify, by the adaptive circuit, the at least one feature of the custom user virtual coach.

* * * * *